US010567823B2

(12) United States Patent
Navin et al.

(10) Patent No.: US 10,567,823 B2
(45) Date of Patent: *Feb. 18, 2020

(54) RELEVANT ADVERTISEMENT GENERATION BASED ON A USER OPERATING A CLIENT DEVICE COMMUNICATIVELY COUPLED WITH A NETWORKED MEDIA DEVICE

(71) Applicants: Ashwin Navin, San Francisco, CA (US); Omar Zennadi, San Francisco, CA (US); David Harrison, Reno, NV (US)

(72) Inventors: Ashwin Navin, San Francisco, CA (US); Omar Zennadi, San Francisco, CA (US); David Harrison, Reno, NV (US)

(73) Assignee: FREE STREAM MEDIA CORP., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,891

(22) Filed: Dec. 24, 2013

(65) Prior Publication Data

US 2015/0181268 A1 Jun. 25, 2015
US 2018/0227618 A9 Aug. 9, 2018

Related U.S. Application Data

(63) Continuation-in-part of application No. 14/018,408, filed on Sep. 4, 2013, now Pat. No. 9,589,456, and a
(Continued)

(51) Int. Cl.
H04N 21/2668 (2011.01)
H04N 21/81 (2011.01)
(Continued)

(52) U.S. Cl.
CPC ....... *H04N 21/2668* (2013.01); *H04N 21/233* (2013.01); *H04N 21/23418* (2013.01);
(Continued)

(58) Field of Classification Search
CPC .......... H04N 21/812; H04N 21/23418; H04N 21/2668; H04N 21/237; H04N 21/25841;
(Continued)

(56) References Cited

U.S. PATENT DOCUMENTS 3,849,760 A 11/1974 Endou et al.
3,919,479 A 11/1975 Moon et al.
(Continued)

FOREIGN PATENT DOCUMENTS

CA 2553159 A1 10/1998
CA 2413944 A1 6/2003
(Continued)

OTHER PUBLICATIONS

"Cognitive Radio Technology", from the Guest Editor in IEEE Signal Processing Magazine on Nov. 2008 by Maria Gabriella di Benedetto et al. (p. 1) http://ieeexplore.ieee.org/stamp/stamp.jsp?arnumber=4644050.
(Continued)

*Primary Examiner* — Pankaj Kumar
*Assistant Examiner* — Alexander Boyd
(74) *Attorney, Agent, or Firm* — LegalForce RAPC Worldwide

(57) ABSTRACT

A method, apparatus and/or system related to relevant advertisement generation based on a user operating a client device communicatively coupled with a networked media device are disclosed. In one embodiment, a method includes determining that a user is likely viewing a networked media device and/or accessing a client device while viewing the networked media device, determining that the content cur-
(Continued)

rently being displayed on the networked media device is associated with a motion-video advertisement through an automatic content recognition algorithm applied to the networked media device, selecting an alphanumeric advertisement formatted for a display area of the client device based on contextual match between the motion-video advertisement and/or the alphanumeric advertisement, and/or delivering the alphanumeric advertisement to the client device while the motion-video advertisement is still rendering on the networked media device.

30 Claims, 9 Drawing Sheets

Related U.S. Application Data continuation-in-part of application No. 13/943,866, filed on Jul. 17, 2013, now Pat. No. 8,819,255, which is a continuation of application No. 13/904,015, filed on May 28, 2013, now Pat. No. 9,026,668, which is a continuation-in-part of application No. 13/736,031, filed on Jan. 7, 2013, now Pat. No. 9,154,942, said application No. 13/904,015 is a continuation-in-part of application No. 13/470,814, filed on May 14, 2012, now Pat. No. 8,539,072, which is a continuation of application No. 12/592,377, filed on Nov. 23, 2009, now Pat. No. 8,180,891.

(60) Provisional application No. 61/696,711, filed on Sep. 4, 2012, provisional application No. 61/803,754, filed on Mar. 20, 2013, provisional application No. 61/652,153, filed on May 26, 2012, provisional application No. 61/584,168, filed on Jan. 6, 2012, provisional application No. 61/118,286, filed on Nov. 26, 2008.

(51) Int. Cl.
  *H04N 21/439* (2011.01)
  *H04N 21/44* (2011.01)
  *H04N 21/233* (2011.01)
  *H04N 21/234* (2011.01)
  *H04N 21/4782* (2011.01)
  *H04N 21/61* (2011.01)
  *H04N 21/858* (2011.01)

(52) U.S. Cl.
  CPC ... *H04N 21/4394* (2013.01); *H04N 21/44008* (2013.01); *H04N 21/4782* (2013.01); *H04N 21/6125* (2013.01); *H04N 21/812* (2013.01); *H04N 21/8146* (2013.01); *H04N 21/8586* (2013.01)

(58) Field of Classification Search
  CPC ......... H04N 21/25838; H04N 21/4331; H04N 21/4394; H04N 21/44008; H04N 21/458; H04N 21/64322; H04N 21/233; H04N 21/2407; H04N 21/25858; H04N 21/4782; H04N 21/6125; H04N 21/8146; H04N 21/8586
  See application file for complete search history.

(56) References Cited

U.S. PATENT DOCUMENTS

| | | |
|---|---|---|
| 4,025,851 A | 5/1977 | Haselwood et al. |
| 4,230,990 A | 10/1980 | Lert, Jr. et al. |
| 4,258,386 A | 3/1981 | Cheung |
| 4,420,769 A | 12/1983 | Novak |
| 4,450,531 A | 5/1984 | Kenyon et al. |
| 4,574,304 A | 3/1986 | Watanabe et al. |
| 4,677,466 A | 6/1987 | Lert, Jr. et al. |
| 4,697,209 A | 9/1987 | Kiewit et al. |
| 4,739,398 A | 4/1988 | Thomas et al. |
| 4,833,449 A | 5/1989 | Gaffigan |
| 4,843,562 A | 6/1989 | Kenyon et al. |
| 4,888,638 A | 12/1989 | Bohn |
| 4,918,730 A | 4/1990 | Schulze |
| 4,955,070 A | 9/1990 | Welsh et al. |
| 4,967,273 A | 10/1990 | Greenberg |
| 4,993,059 A | 2/1991 | Smith et al. |
| 5,014,125 A | 5/1991 | Pocock et al. |
| 5,019,899 A | 5/1991 | Boles et al. |
| 5,105,184 A | 4/1992 | Pirani |
| 5,155,591 A | 10/1992 | Wachob |
| 5,223,924 A | 6/1993 | Strubbe |
| 5,319,453 A | 6/1994 | Copriviza et al. |
| 5,321,750 A | 6/1994 | Nadan |
| 5,436,653 A | 7/1995 | Ellis et al. |
| 5,481,294 A | 1/1996 | Thomas et al. |
| 5,522,077 A | 5/1996 | Cuthbert et al. |
| 5,539,658 A | 7/1996 | McCullough |
| 5,557,334 A | 9/1996 | Legate |
| 5,572,246 A | 11/1996 | Ellis et al. |
| 5,612,729 A | 3/1997 | Ellis et al. |
| 5,636,346 A | 6/1997 | Saxe |
| 5,724,521 A | 3/1998 | Dedrick |
| 5,732,219 A | 3/1998 | Blumer et al. |
| 5,742,768 A | 4/1998 | Gennaro et al. |
| 5,745,884 A | 4/1998 | Carnegie et al. |
| 5,761,601 A | 6/1998 | Nemirofsky et al. |
| 5,761,648 A | 6/1998 | Golden et al. |
| 5,761,655 A | 6/1998 | Hoffman |
| 5,774,170 A | 6/1998 | Hite et al. |
| 5,774,673 A | 6/1998 | Beuk et al. |
| 5,805,974 A | 9/1998 | Hite et al. |
| 5,815,665 A | 9/1998 | Teper et al. |
| 5,822,525 A | 10/1998 | Tafoya et al. |
| 5,838,301 A | 11/1998 | Okamoto et al. |
| 5,838,317 A | 11/1998 | Bolnick et al. |
| 5,848,396 A | 12/1998 | Gerace |
| 5,850,517 A | 12/1998 | Verkler et al. |
| 5,892,900 A | 4/1999 | Ginter et al. |
| 5,903,729 A | 5/1999 | Reber et al. |
| 5,905,942 A | 5/1999 | Stoel et al. |
| 5,907,279 A | 5/1999 | Bruins et al. |
| 5,940,073 A | 8/1999 | Klosterman et al. |
| 5,948,061 A | 9/1999 | Merriman et al. |
| 5,966,705 A | 10/1999 | Koneru et al. |
| 5,977,962 A | 11/1999 | Chapman et al. |
| 5,978,835 A | 11/1999 | Ludwig et al. |
| 6,002,393 A | 12/1999 | Hite et al. |
| 6,002,443 A | 12/1999 | Iggulden |
| 6,009,409 A | 12/1999 | Adler et al. |
| 6,009,410 A | 12/1999 | LeMole et al. |
| 6,026,368 A | 2/2000 | Brown et al. |
| 6,026,369 A | 2/2000 | Capek |
| 6,032,181 A | 2/2000 | Bedgedjian et al. |
| 6,043,817 A | 3/2000 | Bolnick et al. |
| 6,055,510 A | 4/2000 | Henrick et al. |
| 6,064,980 A | 5/2000 | Jacobi et al. |
| 6,084,628 A | 7/2000 | Sawyer |
| 6,105,122 A | 8/2000 | Muller et al. |
| 6,112,181 A | 8/2000 | Shear et al. |
| 6,118,864 A | 9/2000 | Chang et al. |
| 6,119,098 A | 9/2000 | Guyot et al. |
| 6,137,892 A | 10/2000 | Powell et al. |
| 6,141,010 A | 10/2000 | Hoyle |
| 6,157,941 A | 12/2000 | Verkler et al. |
| 6,167,427 A | 12/2000 | Rabinovich et al. |
| 6,169,542 B1 | 1/2001 | Hooks et al. |
| 6,188,398 B1 | 2/2001 | Collins-Rector et al. |
| 6,192,476 B1 | 2/2001 | Gong |
| 6,195,696 B1 | 2/2001 | Baber et al. |
| 6,216,141 B1 | 4/2001 | Straub et al. |
| 6,219,696 B1 | 4/2001 | Wynblatt et al. |
| 6,247,077 B1 | 6/2001 | Muller et al. |

(56) References Cited

U.S. PATENT DOCUMENTS

| | | |
|---|---|---|
| 6,286,104 B1 | 9/2001 | Buhle et al. |
| 6,304,523 B1 | 10/2001 | Jones et al. |
| 6,304,852 B1 | 10/2001 | Loncteaux |
| 6,308,327 B1 | 10/2001 | Liu et al. |
| 6,310,889 B1 | 10/2001 | Parsons et al. |
| 6,332,127 B1 | 12/2001 | Bandera et al. |
| 6,349,289 B1 | 2/2002 | Peterson et al. |
| 6,351,467 B1 | 2/2002 | Dillon |
| 6,360,254 B1 | 3/2002 | Linden et al. |
| 6,381,362 B1 | 4/2002 | Deshpande et al. |
| 6,400,265 B1 | 6/2002 | Saylor et al. |
| 6,400,996 B1 | 6/2002 | Hoffberg et al. |
| 6,438,594 B1 | 8/2002 | Bowman-Amuah |
| 6,463,585 B1 | 10/2002 | Hendricks et al. |
| 6,469,749 B1 | 10/2002 | Dimitrova et al. |
| 6,481,010 B2 | 11/2002 | Nishikawa et al. |
| 6,484,148 B1 | 11/2002 | Boyd |
| 6,505,169 B1 | 1/2003 | Bhagavath et al. |
| 6,526,491 B2 | 2/2003 | Suzuoki et al. |
| 6,530,082 B1 | 3/2003 | Del Sesto et al. |
| 6,532,218 B1 | 3/2003 | Shaffer et al. |
| 6,536,041 B1 | 3/2003 | Knudson et al. |
| 6,546,554 B1 | 4/2003 | Schmidt et al. |
| 6,564,260 B1 | 5/2003 | Baber et al. |
| 6,564,263 B1 | 5/2003 | Bergman et al. |
| 6,574,793 B1 | 6/2003 | Ngo et al. |
| 6,577,346 B1 | 6/2003 | Perlman |
| 6,597,405 B1 | 7/2003 | Iggulden |
| 6,622,171 B2 | 9/2003 | Gupta et al. |
| 6,628,801 B2 | 9/2003 | Powell et al. |
| 6,631,523 B1 | 10/2003 | Matthews, III et al. |
| 6,651,251 B1 | 11/2003 | Shoff et al. |
| 6,718,551 B1 | 4/2004 | Swix et al. |
| 6,728,784 B1 | 4/2004 | Mattaway |
| 6,738,978 B1 | 5/2004 | Hendricks et al. |
| 6,757,685 B2 | 6/2004 | Raffaele et al. |
| 6,769,009 B1 | 7/2004 | Reisman |
| 6,771,316 B1 | 8/2004 | Iggulden |
| 6,799,196 B1 | 9/2004 | Smith |
| 6,804,659 B1 | 10/2004 | Graham et al. |
| 6,832,239 B1 | 12/2004 | Kraft et al. |
| 6,834,308 B1 | 12/2004 | Ikezoye et al. |
| 6,836,888 B1 | 12/2004 | Basu et al. |
| 6,845,452 B1 | 1/2005 | Roddy et al. |
| 6,907,458 B2 | 6/2005 | Tomassetti et al. |
| 6,946,715 B2 | 9/2005 | Hong |
| 6,959,288 B1 | 10/2005 | Medina et al. |
| 6,959,320 B2 | 10/2005 | Shah et al. |
| 6,978,470 B2 | 12/2005 | Swix et al. |
| 6,981,022 B2 | 12/2005 | Boundy |
| 6,983,478 B1 | 1/2006 | Grauch et al. |
| 6,983,481 B2 | 1/2006 | Fellenstein et al. |
| 6,990,453 B2 | 1/2006 | Wang et al. |
| 6,993,326 B2 | 1/2006 | Link, II et al. |
| 7,020,304 B2 | 3/2006 | Alattar et al. |
| 7,028,033 B2 | 4/2006 | Bright et al. |
| 7,028,327 B1 | 4/2006 | Dougherty et al. |
| 7,043,524 B2 | 5/2006 | Shah et al. |
| 7,051,351 B2 | 5/2006 | Goldman et al. |
| 7,064,796 B2 | 6/2006 | Roy et al. |
| 7,080,400 B1 | 7/2006 | Navar |
| 7,088,687 B2 | 8/2006 | Ayyagari et al. |
| 7,089,575 B2 | 8/2006 | Agnihotri et al. |
| 7,089,585 B1 | 8/2006 | Dharmarajan |
| 7,100,183 B2 | 8/2006 | Kunkel et al. |
| 7,111,230 B2 | 9/2006 | Euchner et al. |
| 7,113,090 B1 | 9/2006 | Saylor et al. |
| 7,116,661 B2 | 10/2006 | Patton |
| 7,117,439 B2 | 10/2006 | Barrett et al. |
| 7,136,875 B2 | 11/2006 | Anderson et al. |
| 7,139,882 B2 | 11/2006 | Suzuoki et al. |
| 7,146,627 B1 | 12/2006 | Ismail et al. |
| 7,158,666 B2 | 1/2007 | Deshpande et al. |
| 7,162,539 B2 | 1/2007 | Garcie-Luna-Aceves |
| 7,167,857 B2 | 1/2007 | Roberts |
| 7,181,415 B2 | 2/2007 | Blaser et al. |
| 7,185,353 B2 | 2/2007 | Schlack |
| 7,194,421 B2 | 3/2007 | Conkwright et al. |
| 7,210,157 B2 | 4/2007 | Devara |
| 7,228,280 B1 | 6/2007 | Scherf et al. |
| 7,243,362 B2 | 7/2007 | Swix et al. |
| 7,243,364 B2 | 7/2007 | Dunn et al. |
| 7,296,091 B1 | 11/2007 | Dutta et al. |
| 7,299,195 B1 | 11/2007 | Tawakol et al. |
| 7,308,489 B2 | 12/2007 | Weast |
| 7,328,448 B2 | 2/2008 | Eldering et al. |
| 7,330,875 B1 | 2/2008 | Parasnis et al. |
| 7,346,606 B2 | 3/2008 | Bharat |
| 7,346,649 B1 | 3/2008 | Wong |
| 7,349,967 B2 | 3/2008 | Wang |
| 7,349,980 B1 | 3/2008 | Darugar et al. |
| 7,359,889 B2 | 4/2008 | Wang et al. |
| 7,360,173 B2 | 4/2008 | Tuli |
| 7,366,975 B1 | 4/2008 | Lipton |
| 7,373,381 B2 | 5/2008 | Rust |
| 7,380,258 B2 | 5/2008 | Durden et al. |
| 7,383,243 B2 | 6/2008 | Conkwright et al. |
| 7,421,723 B2 | 9/2008 | Harkness et al. |
| 7,437,301 B2 | 10/2008 | Kageyama et al. |
| 7,444,658 B1 | 10/2008 | Matz et al. |
| 7,444,660 B2 | 10/2008 | Dudkiewicz |
| 7,444,666 B2 | 10/2008 | Edwards et al. |
| 7,454,515 B2 | 11/2008 | Lamkin et al. |
| 7,472,398 B2 | 12/2008 | Corell et al. |
| 7,486,827 B2 | 2/2009 | Kim |
| 7,500,007 B2 | 3/2009 | Ikezoye et al. |
| 7,509,402 B2 | 3/2009 | Moorer et al. |
| 7,516,074 B2 | 4/2009 | Bilobrov |
| 7,516,213 B2 | 4/2009 | Cunningham et al. |
| 7,525,955 B2 | 4/2009 | Velez-Rivera et al. |
| 7,529,659 B2 | 5/2009 | Wold |
| 7,545,940 B2 | 6/2009 | Alessi et al. |
| 7,546,619 B2 | 6/2009 | Anderson et al. |
| 7,552,228 B2 | 6/2009 | Parasnis et al. |
| 7,555,165 B2 | 6/2009 | Luo et al. |
| 7,559,017 B2 | 7/2009 | Datar et al. |
| 7,565,158 B1 | 7/2009 | Aholainen |
| 7,574,723 B2 | 8/2009 | Putterman et al. |
| 7,584,491 B2 | 9/2009 | Bruckner et al. |
| 7,590,998 B2 | 9/2009 | Hanley |
| 7,593,988 B2 | 9/2009 | Oreizy et al. |
| 7,596,620 B1 | 9/2009 | Colton et al. |
| 7,602,748 B2 | 10/2009 | Sinnreich et al. |
| 7,623,823 B2 | 11/2009 | Zito et al. |
| 7,624,142 B2 | 11/2009 | Jungck |
| 7,631,325 B2 | 12/2009 | Rys et al. |
| 7,634,533 B2 | 12/2009 | Rudolph et al. |
| 7,639,387 B2 | 12/2009 | Hull et al. |
| 7,650,616 B2 | 1/2010 | Lee |
| 7,653,008 B2 | 1/2010 | Patrick et al. |
| 7,664,081 B2 | 2/2010 | Luoma et al. |
| 7,665,082 B2 | 2/2010 | Wyatt et al. |
| 7,672,003 B2 | 3/2010 | Dowling et al. |
| 7,689,920 B2 | 3/2010 | Robbin et al. |
| 7,690,006 B2 | 3/2010 | Birnbaum et al. |
| 7,694,319 B1 | 4/2010 | Hassell et al. |
| 7,698,165 B1 | 4/2010 | Tawakol et al. |
| 7,701,882 B2 | 4/2010 | Jones et al. |
| 7,711,748 B2 | 5/2010 | Bright et al. |
| 7,711,838 B1 | 5/2010 | Boulter et al. |
| 7,716,161 B2 | 5/2010 | Dean et al. |
| 7,720,914 B2 | 5/2010 | Goodman et al. |
| 7,729,366 B2 | 6/2010 | Mok et al. |
| 7,734,624 B2 | 6/2010 | Anderson et al. |
| 7,739,140 B2 | 6/2010 | Vinson et al. |
| 7,769,756 B2 | 8/2010 | Krikorian et al. |
| 7,774,348 B2 | 8/2010 | Delli Santi et al. |
| 7,774,715 B1 | 8/2010 | Evans |
| 7,789,757 B2 | 9/2010 | Gemelos et al. |
| 7,793,318 B2 | 9/2010 | Deng |
| 7,797,433 B2 | 9/2010 | Kennedy et al. |
| 7,805,740 B2 | 9/2010 | Gilboa et al. |
| 7,822,809 B2 | 10/2010 | Dhupelia et al. |
| 7,831,426 B2 | 11/2010 | Bennett |

(56) References Cited

U.S. PATENT DOCUMENTS

| | | |
|---|---|---|
| 7,856,644 B2 | 12/2010 | Nicholson et al. |
| 7,861,260 B2 | 12/2010 | Shkedi |
| 7,870,592 B2 | 1/2011 | Hudson et al. |
| 7,870,596 B2 | 1/2011 | Schackow et al. |
| 7,873,716 B2 | 1/2011 | Maes |
| 7,877,461 B1 | 1/2011 | Rimmer |
| 7,877,774 B1 | 1/2011 | Basso et al. |
| 7,890,957 B2 | 2/2011 | Campbell |
| 7,904,503 B2 | 3/2011 | Van De Sluis |
| 7,904,925 B2 | 3/2011 | Jiang |
| 7,907,211 B2 | 3/2011 | Oostveen et al. |
| 7,908,273 B2 | 3/2011 | DiMaria et al. |
| 7,908,618 B2 | 3/2011 | Bruckner et al. |
| 7,912,822 B2 | 3/2011 | Bethlehem et al. |
| 7,921,037 B2 | 4/2011 | Hertling et al. |
| 7,929,551 B2 | 4/2011 | Dietrich et al. |
| 7,930,207 B2 | 4/2011 | Merriman et al. |
| 7,930,546 B2 | 4/2011 | Rhoads et al. |
| 7,933,451 B2 | 4/2011 | Kloer |
| 7,937,405 B2 | 5/2011 | Anderson et al. |
| 7,941,197 B2 | 5/2011 | Jain et al. |
| 7,941,816 B2 | 5/2011 | Harkness et al. |
| 7,950,055 B2 | 5/2011 | Blinn et al. |
| 7,962,007 B2 | 6/2011 | Abe et al. |
| 7,966,309 B2 | 6/2011 | Shacham et al. |
| 7,978,876 B2 | 7/2011 | Powell et al. |
| 7,979,570 B2 | 7/2011 | Chapweske et al. |
| 7,995,503 B2 | 8/2011 | Yu |
| 8,001,124 B2 | 8/2011 | Svendsen |
| 8,020,000 B2 | 9/2011 | Oostveen et al. |
| 8,035,656 B2 | 10/2011 | Blanchard et al. |
| 8,041,643 B2 | 10/2011 | Mukerji et al. |
| 8,046,787 B2 | 10/2011 | Cerrato |
| 8,046,839 B2 | 10/2011 | Lo |
| 8,055,784 B2 | 11/2011 | Kalama et al. |
| 8,060,399 B2 | 11/2011 | Ullah |
| 8,060,912 B2 | 11/2011 | Sato |
| 8,065,700 B2 | 11/2011 | Lee |
| 8,069,247 B2 | 11/2011 | Ruiz-Velasco et al. |
| 8,069,348 B2 | 11/2011 | Bacon |
| 8,071,869 B2 | 12/2011 | Chen et al. |
| 8,079,045 B2 | 12/2011 | Krapf et al. |
| 8,087,047 B2 | 12/2011 | Olague et al. |
| 8,090,706 B2 | 1/2012 | Bharat |
| 8,091,031 B2 | 1/2012 | Evans |
| 8,122,484 B2 | 2/2012 | Karjoth et al. |
| 8,126,963 B1 | 2/2012 | Rimmer |
| 8,131,585 B2 | 3/2012 | Nicholas et al. |
| 8,131,705 B2 | 3/2012 | Chevalier et al. |
| 8,131,734 B2 | 3/2012 | Austin et al. |
| 8,140,965 B2 | 3/2012 | Dean et al. |
| 8,141,111 B2 | 3/2012 | Gilley et al. |
| 8,145,645 B2 | 3/2012 | Delli Santi et al. |
| 8,145,705 B1 | 3/2012 | Rust |
| 8,150,729 B2 | 4/2012 | Wilhelm |
| 8,150,985 B2 | 4/2012 | Nakamura |
| 8,155,696 B2 | 4/2012 | Swanburg et al. |
| 8,161,511 B2 | 4/2012 | Kwak et al. |
| 8,171,030 B2 | 5/2012 | Pereira et al. |
| 8,171,510 B2 | 5/2012 | Kamen et al. |
| 8,175,413 B1 | 5/2012 | Ioffe et al. |
| 8,180,708 B2 | 5/2012 | Hurtado et al. |
| 8,180,891 B1 | 5/2012 | Harrison |
| 8,189,945 B2 | 5/2012 | Stojancic et al. |
| 8,191,091 B1 | 5/2012 | Harvey et al. |
| 8,195,689 B2 | 6/2012 | Ramanathan et al. |
| 8,195,692 B2 | 6/2012 | Baek et al. |
| 8,201,080 B2 | 6/2012 | Basson et al. |
| 8,209,397 B2 | 6/2012 | Ahn et al. |
| 8,209,404 B2 | 6/2012 | Wu |
| 8,214,256 B2 | 7/2012 | Riedl et al. |
| 8,219,411 B2 | 7/2012 | Matz et al. |
| 8,225,347 B1 | 7/2012 | Flickinger et al. |
| 8,229,227 B2 | 7/2012 | Stojancic et al. |
| 8,229,751 B2 | 7/2012 | Cheung |
| 8,239,340 B2 | 8/2012 | Hanson |
| 8,244,707 B2 | 8/2012 | Lin et al. |
| 8,245,270 B2 | 8/2012 | Cooperstein et al. |
| 8,255,949 B1 | 8/2012 | Bayer et al. |
| 8,260,665 B2 | 9/2012 | Foladare et al. |
| 8,261,341 B2 | 9/2012 | Stirbu |
| 8,271,649 B2 | 9/2012 | Kalofonos et al. |
| 8,275,791 B2 | 9/2012 | Raffaele et al. |
| 8,281,288 B1 | 10/2012 | Spencer |
| 8,285,880 B2 | 10/2012 | Ye et al. |
| 8,290,351 B2 | 10/2012 | Plotnick et al. |
| 8,296,763 B1 | 10/2012 | Peercy et al. |
| 8,301,596 B2 | 10/2012 | Lin et al. |
| 8,301,732 B2 | 10/2012 | Chapweske et al. |
| 8,302,170 B2 | 10/2012 | Kramer et al. |
| 8,307,093 B2 | 11/2012 | Klemets et al. |
| 8,316,450 B2 | 11/2012 | Robinson et al. |
| 8,326,872 B2 | 12/2012 | Zwilling et al. |
| 8,332,885 B2 | 12/2012 | Williamson et al. |
| 8,335,786 B2 | 12/2012 | Pereira et al. |
| 8,339,991 B2 | 12/2012 | Biswas et al. |
| 8,341,242 B2 | 12/2012 | Dillon et al. |
| 8,352,980 B2 | 1/2013 | Howcroft |
| 8,355,711 B2 | 1/2013 | Heins et al. |
| 8,358,966 B2 | 1/2013 | Zito et al. |
| 8,364,541 B2 | 1/2013 | Roth |
| 8,364,703 B2 | 1/2013 | Ramanathan et al. |
| 8,364,959 B2 | 1/2013 | Bhanoo et al. |
| 8,365,217 B2 | 1/2013 | Legrand |
| 8,375,131 B2 | 2/2013 | Rogers et al. |
| 8,381,026 B2 | 2/2013 | Talla et al. |
| 8,385,644 B2 | 2/2013 | Stojancic |
| 8,406,607 B2 | 3/2013 | Nesvadba et al. |
| 8,407,240 B2 | 3/2013 | Denton |
| 8,418,191 B2 | 4/2013 | Honishi et al. |
| 8,433,306 B2 | 4/2013 | Rodriguez |
| 8,433,574 B2 | 4/2013 | Jablokov et al. |
| 8,443,420 B2 | 5/2013 | Brown et al. |
| 8,451,762 B2 | 5/2013 | Liu et al. |
| 8,452,864 B1 | 5/2013 | Vendrow |
| 8,463,100 B2 | 6/2013 | Tse et al. |
| 8,468,357 B2 | 6/2013 | Roberts et al. |
| 8,472,289 B2 | 6/2013 | Scherf et al. |
| 8,473,575 B2 | 6/2013 | Marchwicki et al. |
| 8,479,246 B2 | 7/2013 | Hudson et al. |
| 8,488,838 B2 | 7/2013 | Sharma |
| 8,489,701 B2 | 7/2013 | Manion et al. |
| 8,494,907 B2 | 7/2013 | Lerman et al. |
| 8,495,611 B2 | 7/2013 | McCarthy et al. |
| 8,495,675 B1 | 7/2013 | Philpott et al. |
| 8,495,746 B2 | 7/2013 | Fissel et al. |
| 8,504,551 B2 | 8/2013 | Anderson et al. |
| 8,510,317 B2 | 8/2013 | Boetje et al. |
| 8,510,661 B2 | 8/2013 | Dharmaji et al. |
| 8,510,779 B2 | 8/2013 | Slothouber et al. |
| 8,516,533 B2 | 8/2013 | Davis et al. |
| 8,520,909 B2 | 8/2013 | Leung et al. |
| 8,527,594 B2 | 9/2013 | Lahaix |
| 8,533,192 B2 | 9/2013 | Moganti et al. |
| 8,537,157 B2 | 9/2013 | Adimatyam et al. |
| 8,539,025 B2 | 9/2013 | Husain et al. |
| 8,539,072 B1 | 9/2013 | Harrison |
| 8,539,523 B2 | 9/2013 | Philpott et al. |
| 8,548,820 B2 | 10/2013 | Matz et al. |
| 8,549,052 B2 | 10/2013 | Miles |
| 8,549,066 B1 | 10/2013 | Donahue et al. |
| 8,549,110 B2 | 10/2013 | Jerbi et al. |
| 8,549,550 B2 | 10/2013 | Lopatecki et al. |
| 8,566,154 B2 | 10/2013 | Merriman et al. |
| 8,566,158 B2 | 10/2013 | Cansler et al. |
| 8,566,867 B1 | 10/2013 | Yang et al. |
| 8,577,996 B2 | 11/2013 | Hughes et al. |
| 8,595,781 B2 | 11/2013 | Neumeier et al. |
| 8,607,267 B2 | 12/2013 | Shkedi |
| 8,611,701 B2 | 12/2013 | Zhang |
| 8,613,045 B1 | 12/2013 | Shigapov |
| 8,621,585 B2 | 12/2013 | Danieli et al. |
| 8,635,106 B2 | 1/2014 | Sarukkai et al. |
| 8,635,316 B2 | 1/2014 | Barnhill, Jr. |

(56) References Cited

U.S. PATENT DOCUMENTS

| | | |
|---|---|---|
| 8,639,826 B2 | 1/2014 | Slothouber et al. |
| 8,645,209 B2 | 2/2014 | Mandyam et al. |
| 8,645,992 B2 | 2/2014 | Russell et al. |
| 8,645,994 B2 | 2/2014 | Vemparala et al. |
| 8,646,063 B2 | 2/2014 | Dowlatkhah |
| 8,655,716 B1 | 2/2014 | Barnes et al. |
| 8,656,422 B2 | 2/2014 | Kumar et al. |
| 8,661,010 B2 | 2/2014 | Lin et al. |
| 8,666,168 B2 | 3/2014 | Stojancic et al. |
| 8,667,142 B2 | 3/2014 | Takei et al. |
| 8,677,253 B2 | 3/2014 | Duquene et al. |
| 8,694,656 B2 | 4/2014 | Douillet et al. |
| 8,695,032 B2 | 4/2014 | Shkedi |
| 8,700,699 B2 | 4/2014 | Shen et al. |
| 8,700,795 B2 | 4/2014 | Boulter et al. |
| 8,701,134 B2 | 4/2014 | Whinmill et al. |
| 8,707,351 B2 | 4/2014 | Dharmaji |
| 8,712,833 B2 | 4/2014 | Quach et al. |
| 8,719,396 B2 | 5/2014 | Brindley et al. |
| 8,719,870 B1 | 5/2014 | Davies et al. |
| 8,732,182 B2 | 5/2014 | Bethlehem et al. |
| 8,736,764 B2 | 5/2014 | Amundsen |
| 8,738,779 B2 | 5/2014 | Binding et al. |
| 8,739,208 B2 | 5/2014 | Davis et al. |
| 8,751,942 B2 | 6/2014 | Lopez et al. |
| 8,756,686 B2 | 6/2014 | Plattner et al. |
| 8,763,033 B2 | 6/2014 | Dittus |
| 8,763,097 B2 | 6/2014 | Bhatnagar et al. |
| 8,745,272 B2 | 7/2014 | Casalaina et al. |
| 8,769,584 B2 | 7/2014 | Neumeier et al. |
| 8,775,391 B2 | 7/2014 | Kalavade |
| 8,776,112 B2 | 7/2014 | Roberts et al. |
| 8,776,154 B2 | 7/2014 | Kim et al. |
| 8,776,244 B2 | 7/2014 | Kroeger et al. |
| 8,793,730 B2 | 7/2014 | Mowrey et al. |
| 8,799,357 B2 | 8/2014 | Clift et al. |
| 8,804,039 B2 | 8/2014 | Kim et al. |
| 8,804,721 B2 | 8/2014 | He et al. |
| 8,805,354 B2 | 8/2014 | Chen et al. |
| 8,805,657 B2 | 8/2014 | Wells et al. |
| 8,812,451 B2 | 8/2014 | Shukla et al. |
| 8,813,232 B2 | 8/2014 | Sreedharan et al. |
| 8,817,757 B2 | 8/2014 | Luo |
| 8,819,249 B2 | 8/2014 | Harrison |
| 8,819,255 B1 | 8/2014 | Harrison |
| 8,825,526 B2 | 9/2014 | Peters et al. |
| 8,826,327 B2 | 9/2014 | Adimatyam et al. |
| 8,832,729 B2 | 9/2014 | Nussel et al. |
| 8,838,149 B2 | 9/2014 | Hasek |
| 8,838,556 B1 | 9/2014 | Reiner et al. |
| 8,838,808 B2 | 9/2014 | Addala et al. |
| 8,843,584 B2 | 9/2014 | Arini et al. |
| 8,847,994 B2 | 9/2014 | Choi |
| 8,849,821 B2 | 9/2014 | Schloter |
| 8,855,796 B2 | 10/2014 | Otsuka et al. |
| 8,855,798 B2 | 10/2014 | Dimaria et al. |
| 8,856,028 B2 | 10/2014 | Yang et al. |
| 8,856,087 B2 | 10/2014 | Greene et al. |
| 8,856,874 B2 | 10/2014 | Pieczul et al. |
| 8,863,165 B2 | 10/2014 | Gordon |
| 8,863,168 B2 | 10/2014 | Craner |
| 8,863,174 B2 | 10/2014 | Neil et al. |
| 8,875,178 B2 | 10/2014 | Cansler et al. |
| 8,898,714 B2 | 11/2014 | Neumeier et al. |
| 8,904,021 B2 | 12/2014 | Harrison |
| 8,910,199 B2 | 12/2014 | Slaney et al. |
| 8,930,980 B2 | 1/2015 | Neumeier et al. |
| 8,949,872 B2 | 2/2015 | Slaney et al. |
| 8,966,525 B2 | 2/2015 | Mehta et al. |
| 8,972,485 B1 | 3/2015 | French et al. |
| 8,996,538 B1 | 3/2015 | Cremer et al. |
| 8,997,164 B2 | 3/2015 | Gordon et al. |
| 9,009,066 B2 | 4/2015 | Long et al. |
| 9,015,741 B2 | 4/2015 | Gordon |
| 9,026,668 B2 | 5/2015 | Harrison |
| 9,032,451 B2 | 5/2015 | Cansino et al. |
| 9,036,083 B1 | 5/2015 | Zhu et al. |
| 9,043,712 B2 | 5/2015 | Santoro et al. |
| 9,049,496 B2 | 6/2015 | Raesig et al. |
| 9,055,309 B2 | 6/2015 | Neumeier et al. |
| 9,106,804 B2 | 8/2015 | Roberts et al. |
| 9,113,107 B2 | 8/2015 | Jolna et al. |
| 9,118,945 B2 | 8/2015 | Rudman et al. |
| 9,131,279 B2 | 9/2015 | Raveendran et al. |
| 9,143,718 B2 | 9/2015 | Nagorski et al. |
| 9,146,990 B2 | 9/2015 | Scherf et al. |
| 9,152,727 B1 | 10/2015 | Balducci et al. |
| 9,154,942 B2 | 10/2015 | Harrison et al. |
| 9,160,337 B2 | 10/2015 | Jeffrey et al. |
| 9,167,419 B2 | 10/2015 | Harrison |
| 9,183,560 B2 | 11/2015 | Abelow |
| 9,185,458 B2 | 11/2015 | Jacoby |
| 9,185,462 B2 | 11/2015 | Das et al. |
| 9,204,275 B2 | 12/2015 | Johnson et al. |
| 9,213,747 B2 | 12/2015 | Cremer et al. |
| 9,215,217 B2 | 12/2015 | Abu-Hakima et al. |
| 9,232,279 B2 | 1/2016 | Beeson et al. |
| 9,258,383 B2 | 2/2016 | Harrison |
| 9,271,052 B2 | 2/2016 | Holden |
| 9,286,902 B2 | 3/2016 | Han et al. |
| 9,300,996 B2 | 3/2016 | Jeong et al. |
| 9,323,840 B2 | 4/2016 | Harron et al. |
| 9,355,554 B2 | 5/2016 | Sievert et al. |
| 9,356,914 B2 | 5/2016 | Jeffrey et al. |
| 9,361,606 B2 | 6/2016 | Hertel et al. |
| 9,372,531 B2 | 6/2016 | Benson et al. |
| 9,378,512 B2 | 6/2016 | Singh et al. |
| 9,380,383 B2 | 6/2016 | Brenner et al. |
| 9,386,356 B2 | 7/2016 | Harrison |
| 9,398,262 B2 | 7/2016 | Li et al. |
| 9,465,995 B2 | 10/2016 | Harron et al. |
| 9,495,451 B2 | 11/2016 | Harron |
| 9,501,568 B2 | 11/2016 | Rafii |
| 9,510,044 B1 | 11/2016 | Pereira et al. |
| 9,510,057 B2 | 11/2016 | Harron et al. |
| 2001/0001160 A1 | 5/2001 | Shoff et al. |
| 2001/0011226 A1 | 8/2001 | Greer et al. |
| 2001/0016501 A1 | 8/2001 | King |
| 2001/0016947 A1 | 8/2001 | Nishikawa et al. |
| 2001/0029583 A1 | 10/2001 | Palatov et al. |
| 2001/0036224 A1 | 11/2001 | Demelloet et al. |
| 2001/0039658 A1 | 11/2001 | Walton |
| 2001/0049620 A1 | 12/2001 | Blasko |
| 2001/0054155 A1 | 12/2001 | Hagan et al. |
| 2001/0054181 A1 | 12/2001 | Corvin |
| 2002/0012347 A1 | 1/2002 | Fitzpatrick |
| 2002/0015105 A1 | 2/2002 | Abe et al. |
| 2002/0019769 A1 | 2/2002 | Barritz et al. |
| 2002/0026635 A1 | 2/2002 | Wheeler et al. |
| 2002/0032906 A1 | 3/2002 | Grossman |
| 2002/0042914 A1 | 4/2002 | Walker et al. |
| 2002/0044659 A1 | 4/2002 | Ohta |
| 2002/0044683 A1 | 4/2002 | Deshpande et al. |
| 2002/0052965 A1 | 5/2002 | Dowling |
| 2002/0059633 A1 | 5/2002 | Harkness et al. |
| 2002/0066100 A1 | 5/2002 | Hoang |
| 2002/0069100 A1 | 6/2002 | Arberman |
| 2002/0072966 A1 | 6/2002 | Eldering et al. |
| 2002/0072982 A1 | 6/2002 | Barton et al. |
| 2002/0078456 A1 | 6/2002 | Hudson et al. |
| 2002/0083435 A1 | 6/2002 | Blasko et al. |
| 2002/0083441 A1 | 6/2002 | Flickinger et al. |
| 2002/0083443 A1 | 6/2002 | Eldering et al. |
| 2002/0087401 A1 | 7/2002 | Leapman et al. |
| 2002/0087545 A1 | 7/2002 | Bright et al. |
| 2002/0087975 A1 | 7/2002 | Schlack |
| 2002/0087976 A1 | 7/2002 | Kaplan et al. |
| 2002/0087978 A1 | 7/2002 | Nicholson et al. |
| 2002/0091763 A1 | 7/2002 | Shah et al. |
| 2002/0104083 A1 | 8/2002 | Hendricks et al. |
| 2002/0116195 A1 | 8/2002 | Pitman et al. |
| 2002/0116549 A1 | 8/2002 | Raffaele et al. |
| 2002/0120498 A1 | 8/2002 | Gordon et al. |
| 2002/0120925 A1 | 8/2002 | Logan |

(56) References Cited

U.S. PATENT DOCUMENTS

| | | |
|---|---|---|
| 2002/0123928 A1 | 9/2002 | Eldering et al. |
| 2002/0133490 A1 | 9/2002 | Conkwright et al. |
| 2002/0133534 A1 | 9/2002 | Forslow |
| 2002/0138842 A1 | 9/2002 | Chong et al. |
| 2002/0143782 A1 | 10/2002 | Headings et al. |
| 2002/0144262 A1 | 10/2002 | Plotnick et al. |
| 2002/0147611 A1 | 10/2002 | Greene et al. |
| 2002/0151992 A1 | 10/2002 | Hoffberg et al. |
| 2002/0152474 A1 | 10/2002 | Dudkiewicz |
| 2002/0161741 A1 | 10/2002 | Wang et al. |
| 2002/0162117 A1 | 10/2002 | Pearson et al. |
| 2002/0162118 A1 | 10/2002 | Levy et al. |
| 2002/0174197 A1 | 11/2002 | Schimke et al. |
| 2002/0178447 A1 | 11/2002 | Plotnick et al. |
| 2002/0196789 A1 | 12/2002 | Patton |
| 2003/0001883 A1 | 1/2003 | Wang |
| 2003/0009538 A1 | 1/2003 | Shah et al. |
| 2003/0023489 A1 | 1/2003 | McGuire et al. |
| 2003/0028433 A1 | 2/2003 | Merriman et al. |
| 2003/0030752 A1 | 2/2003 | Begeja et al. |
| 2003/0031176 A1 | 2/2003 | Sim |
| 2003/0036949 A1 | 2/2003 | Kaddeche et al. |
| 2003/0070167 A1 | 4/2003 | Holtz et al. |
| 2003/0079226 A1 | 4/2003 | Barrett |
| 2003/0097426 A1 | 5/2003 | Parry |
| 2003/0097657 A1 | 5/2003 | Zhou et al. |
| 2003/0101451 A1 | 5/2003 | Bentolila et al. |
| 2003/0101454 A1 | 5/2003 | Ozer et al. |
| 2003/0121037 A1 | 6/2003 | Swix et al. |
| 2003/0121046 A1 | 6/2003 | Roy et al. |
| 2003/0135513 A1 | 7/2003 | Quinn et al. |
| 2003/0135853 A1 | 7/2003 | Goldman et al. |
| 2003/0145323 A1 | 7/2003 | Hendricks et al. |
| 2003/0149975 A1 | 8/2003 | Eldering et al. |
| 2003/0154475 A1 | 8/2003 | Rodriguez et al. |
| 2003/0163583 A1 | 8/2003 | Tarr |
| 2003/0163828 A1 | 8/2003 | Agnihotri et al. |
| 2003/0172374 A1 | 9/2003 | Vinson et al. |
| 2003/0188318 A1 | 10/2003 | Liew et al. |
| 2003/0188321 A1 | 10/2003 | Shoff et al. |
| 2003/0226141 A1 | 12/2003 | Krasnow et al. |
| 2003/0229765 A1 | 12/2003 | Suzuoki et al. |
| 2004/0006693 A1 | 1/2004 | Vasnani et al. |
| 2004/0006706 A1 | 1/2004 | Erlingsson |
| 2004/0025034 A1 | 2/2004 | Alessi et al. |
| 2004/0025174 A1 | 2/2004 | Cerrato |
| 2004/0031052 A1 | 2/2004 | Wannamaker et al. |
| 2004/0045020 A1 | 3/2004 | Witt et al. |
| 2004/0059708 A1 | 3/2004 | Dean et al. |
| 2004/0078809 A1 | 4/2004 | Drazin |
| 2004/0088348 A1 | 5/2004 | Yeager et al. |
| 2004/0143349 A1 | 7/2004 | Roberts et al. |
| 2004/0148625 A1 | 7/2004 | Eldering et al. |
| 2004/0158858 A1 | 8/2004 | Paxton et al. |
| 2004/0163101 A1 | 8/2004 | Swix et al. |
| 2004/0207719 A1 | 10/2004 | Tervo et al. |
| 2004/0210630 A1 | 10/2004 | Simonnet et al. |
| 2004/0215509 A1 | 10/2004 | Perry |
| 2004/0215515 A1 | 10/2004 | Perry |
| 2004/0216171 A1 | 10/2004 | Barone, Jr. et al. |
| 2004/0224723 A1* | 11/2004 | Farcasiu ............ H04M 1/7253 455/557 |
| 2004/0225686 A1 | 11/2004 | Li et al. |
| 2004/0226035 A1 | 11/2004 | Hauser |
| 2004/0237102 A1 | 11/2004 | Konig et al. |
| 2004/0240562 A1 | 12/2004 | Bargeron et al. |
| 2004/0260791 A1 | 12/2004 | Jerbi et al. |
| 2004/0267723 A1 | 12/2004 | Bharat |
| 2005/0002640 A1 | 1/2005 | Putterman et al. |
| 2005/0015795 A1 | 1/2005 | Iggulden |
| 2005/0015796 A1 | 1/2005 | Bruckner et al. |
| 2005/0021670 A1 | 1/2005 | Maes |
| 2005/0028200 A1 | 2/2005 | Sardera |
| 2005/0028201 A1 | 2/2005 | Klosterman et al. |
| 2005/0028206 A1 | 2/2005 | Cameron et al. |
| 2005/0071224 A1 | 3/2005 | Fikes et al. |
| 2005/0080876 A1 | 4/2005 | Peiffer et al. |
| 2005/0080878 A1 | 4/2005 | Cunningham et al. |
| 2005/0091301 A1 | 4/2005 | Oreizy et al. |
| 2005/0108213 A1 | 5/2005 | Riise et al. |
| 2005/0108745 A1 | 5/2005 | Linzer |
| 2005/0120391 A1 | 6/2005 | Haynie et al. |
| 2005/0165696 A1 | 7/2005 | Jakobsson et al. |
| 2005/0183143 A1 | 8/2005 | Anderholm et al. |
| 2005/0204381 A1 | 9/2005 | Ludvig et al. |
| 2005/0210502 A1 | 9/2005 | Flickinger et al. |
| 2005/0232411 A1 | 10/2005 | Srinivasan et al. |
| 2005/0235318 A1 | 10/2005 | Grauch et al. |
| 2005/0251491 A1 | 11/2005 | Medina et al. |
| 2005/0251577 A1 | 11/2005 | Guo et al. |
| 2005/0251820 A1 | 11/2005 | Stefanik et al. |
| 2005/0259819 A1 | 11/2005 | Oomen et al. |
| 2005/0267896 A1 | 12/2005 | Goodman et al. |
| 2005/0283796 A1 | 12/2005 | Flickinger |
| 2006/0029368 A1 | 2/2006 | Harville |
| 2006/0031381 A1 | 2/2006 | Van Luijt et al. |
| 2006/0064299 A1 | 3/2006 | Uhle et al. |
| 2006/0064583 A1 | 3/2006 | Birnbaum et al. |
| 2006/0072144 A1 | 4/2006 | Dowling et al. |
| 2006/0072542 A1 | 4/2006 | Sinnreich et al. |
| 2006/0085383 A1 | 4/2006 | Mantle et al. |
| 2006/0085642 A1 | 4/2006 | Multerer et al. |
| 2006/0092834 A1 | 5/2006 | Honishi et al. |
| 2006/0133414 A1 | 6/2006 | Luoma et al. |
| 2006/0136964 A1 | 6/2006 | Diez et al. |
| 2006/0143188 A1 | 6/2006 | Bright et al. |
| 2006/0149624 A1 | 7/2006 | Baluja et al. |
| 2006/0153296 A1 | 7/2006 | Deng |
| 2006/0156362 A1 | 7/2006 | Perrot |
| 2006/0168291 A1 | 7/2006 | van Zoest et al. |
| 2006/0168616 A1 | 7/2006 | Candelore |
| 2006/0195860 A1 | 8/2006 | Eldering et al. |
| 2006/0212908 A1 | 9/2006 | Hunter et al. |
| 2006/0218617 A1 | 9/2006 | Bradstreet et al. |
| 2006/0230130 A1 | 10/2006 | Cho et al. |
| 2006/0245724 A1 | 11/2006 | Hwang et al. |
| 2006/0247011 A1 | 11/2006 | Gagner |
| 2006/0247937 A1 | 11/2006 | Binding et al. |
| 2006/0248558 A1 | 11/2006 | Barton et al. |
| 2006/0253330 A1 | 11/2006 | Maggio et al. |
| 2006/0265493 A1 | 11/2006 | Brindley et al. |
| 2006/0287912 A1 | 12/2006 | Raghuvamshi |
| 2007/0047781 A1 | 3/2007 | Hull et al. |
| 2007/0050832 A1 | 3/2007 | Wright et al. |
| 2007/0050854 A1 | 3/2007 | Cooperstein et al. |
| 2007/0056008 A1 | 3/2007 | Nagamoto et al. |
| 2007/0061724 A1 | 3/2007 | Slothouber et al. |
| 2007/0061831 A1 | 3/2007 | Savoor et al. |
| 2007/0072676 A1 | 3/2007 | Baluja |
| 2007/0073581 A1 | 3/2007 | Kempe et al. |
| 2007/0078706 A1 | 4/2007 | Datta et al. |
| 2007/0083908 A1 | 4/2007 | McCarthy et al. |
| 2007/0088801 A1 | 4/2007 | Levkovitz et al. |
| 2007/0088852 A1 | 4/2007 | Levkovitz |
| 2007/0089158 A1 | 4/2007 | Clark et al. |
| 2007/0100690 A1 | 5/2007 | Hopkins |
| 2007/0106405 A1 | 5/2007 | Cook et al. |
| 2007/0106721 A1 | 5/2007 | Schloter |
| 2007/0108721 A1 | 5/2007 | Bayne et al. |
| 2007/0109449 A1 | 5/2007 | Cheung |
| 2007/0113243 A1 | 5/2007 | Brey |
| 2007/0113263 A1 | 5/2007 | Chatani |
| 2007/0116365 A1 | 5/2007 | Kloer |
| 2007/0124756 A1 | 5/2007 | Covell et al. |
| 2007/0129108 A1 | 6/2007 | Swanburg et al. |
| 2007/0143796 A1 | 6/2007 | Malik |
| 2007/0156726 A1 | 7/2007 | Levy |
| 2007/0157231 A1 | 7/2007 | Eldering et al. |
| 2007/0168389 A1 | 7/2007 | Lipscomb |
| 2007/0174059 A1 | 7/2007 | Rhoads et al. |
| 2007/0180459 A1 | 8/2007 | Smithpeters et al. |
| 2007/0186240 A1 | 8/2007 | Ward et al. |
| 2007/0192450 A1 | 8/2007 | Lewis |
| 2007/0198339 A1 | 8/2007 | Shen et al. |

(56) References Cited

U.S. PATENT DOCUMENTS

| | | |
|---|---|---|
| 2007/0208619 A1 | 9/2007 | Branam et al. |
| 2007/0208711 A1 | 9/2007 | Rhoads et al. |
| 2007/0220024 A1 | 9/2007 | Putterman et al. |
| 2007/0220575 A1 | 9/2007 | Cooper et al. |
| 2007/0234382 A1 | 10/2007 | Swix et al. |
| 2007/0244750 A1 | 10/2007 | Grannan et al. |
| 2007/0250590 A1 | 10/2007 | Flannery et al. |
| 2007/0250716 A1 | 10/2007 | Brunk et al. |
| 2007/0253594 A1 | 11/2007 | Lu et al. |
| 2007/0260520 A1 | 11/2007 | Jha et al. |
| 2007/0266403 A1 | 11/2007 | Ou et al. |
| 2007/0271300 A1 | 11/2007 | Ramaswamy |
| 2007/0274537 A1 | 11/2007 | Srinivasan |
| 2007/0283384 A1 | 12/2007 | Haeuser et al. |
| 2007/0283402 A1 | 12/2007 | Yu |
| 2007/0288985 A1 | 12/2007 | Candelore et al. |
| 2007/0291747 A1 | 12/2007 | Stern et al. |
| 2007/0291761 A1 | 12/2007 | Kauniskangas et al. |
| 2007/0294721 A1 | 12/2007 | Haeuser et al. |
| 2007/0300264 A1 | 12/2007 | Turner |
| 2007/0300273 A1 | 12/2007 | Turner |
| 2007/0300280 A1 | 12/2007 | Turner et al. |
| 2008/0004957 A1 | 1/2008 | Hildreth et al. |
| 2008/0010133 A1 | 1/2008 | Pyhalammi et al. |
| 2008/0040666 A1 | 2/2008 | Wang et al. |
| 2008/0040767 A1 | 2/2008 | McCarthy et al. |
| 2008/0046945 A1 | 2/2008 | Hanley |
| 2008/0052195 A1 | 2/2008 | Roth et al. |
| 2008/0059285 A1 | 3/2008 | Hamoui |
| 2008/0060002 A1 | 3/2008 | Noll et al. |
| 2008/0066080 A1 | 3/2008 | Campbell |
| 2008/0066098 A1 | 3/2008 | Witteman et al. |
| 2008/0089551 A1 | 4/2008 | Heather et al. |
| 2008/0109376 A1 | 5/2008 | Walsh et al. |
| 2008/0109844 A1 | 5/2008 | Baldeschwieler et al. |
| 2008/0109888 A1* | 5/2008 | Ullah .................. G06F 21/10 726/7 |
| 2008/0127263 A1 | 5/2008 | Klosterman et al. |
| 2008/0140476 A1 | 6/2008 | Anand et al. |
| 2008/0154678 A1 | 6/2008 | Botelho |
| 2008/0155588 A1 | 6/2008 | Roberts et al. |
| 2008/0155591 A1 | 6/2008 | Mahajan et al. |
| 2008/0155627 A1 | 6/2008 | O'Connor et al. |
| 2008/0172243 A1 | 7/2008 | Kelly |
| 2008/0172747 A1 | 7/2008 | Hurtado et al. |
| 2008/0174570 A1 | 7/2008 | Jobs et al. |
| 2008/0181225 A1 | 7/2008 | Zampiello |
| 2008/0186933 A1 | 8/2008 | Willman et al. |
| 2008/0189757 A1 | 8/2008 | Schackow et al. |
| 2008/0195457 A1 | 8/2008 | Sherman et al. |
| 2008/0195749 A1 | 8/2008 | Krig |
| 2008/0201222 A1 | 8/2008 | Lahaix |
| 2008/0201734 A1 | 8/2008 | Lyon et al. |
| 2008/0221987 A1 | 9/2008 | Sundaresan et al. |
| 2008/0222045 A1 | 9/2008 | Mukerji et al. |
| 2008/0222711 A1 | 9/2008 | Michaelis |
| 2008/0228581 A1 | 9/2008 | Yonezaki et al. |
| 2008/0229335 A1 | 9/2008 | Robbin et al. |
| 2008/0243535 A1 | 10/2008 | Binding et al. |
| 2008/0244418 A1 | 10/2008 | Manolescu et al. |
| 2008/0263583 A1* | 10/2008 | Heath ............ H04N 21/2668 725/32 |
| 2008/0263600 A1 | 10/2008 | Olague et al. |
| 2008/0268828 A1 | 10/2008 | Nagaraja |
| 2008/0276265 A1 | 11/2008 | Topchy et al. |
| 2008/0276266 A1 | 11/2008 | Huchital et al. |
| 2008/0276270 A1 | 11/2008 | Kotaru et al. |
| 2008/0288631 A1 | 11/2008 | Faisal et al. |
| 2008/0300011 A1 | 12/2008 | Rhoads et al. |
| 2008/0306820 A1 | 12/2008 | Passmore |
| 2008/0307460 A1 | 12/2008 | Knudson et al. |
| 2008/0310731 A1 | 12/2008 | Stojancic et al. |
| 2008/0313140 A1 | 12/2008 | Pereira et al. |
| 2008/0313648 A1 | 12/2008 | Wang et al. |
| 2008/0317278 A1 | 12/2008 | Lefebvre et al. |
| 2009/0006207 A1 | 1/2009 | Datar et al. |
| 2009/0011744 A1 | 1/2009 | Daley et al. |
| 2009/0044223 A1 | 2/2009 | Jiang et al. |
| 2009/0049384 A1 | 2/2009 | Yau |
| 2009/0052784 A1 | 2/2009 | Covell et al. |
| 2009/0055537 A1 | 2/2009 | Takei et al. |
| 2009/0061841 A1 | 3/2009 | Chaudhri et al. |
| 2009/0063691 A1 | 3/2009 | Kalofonos et al. |
| 2009/0070473 A1 | 3/2009 | Baum et al. |
| 2009/0076321 A1 | 3/2009 | Brenner et al. |
| 2009/0077580 A1 | 3/2009 | Konig et al. |
| 2009/0083417 A1 | 3/2009 | Hughes et al. |
| 2009/0088878 A1 | 4/2009 | Otsuka et al. |
| 2009/0089251 A1 | 4/2009 | Johnston et al. |
| 2009/0094093 A1 | 4/2009 | Phan |
| 2009/0100361 A1 | 4/2009 | Abello et al. |
| 2009/0119576 A1 | 5/2009 | Pepper et al. |
| 2009/0147718 A1 | 6/2009 | Liu et al. |
| 2009/0153289 A1 | 6/2009 | Hope et al. |
| 2009/0163227 A1 | 6/2009 | Collins |
| 2009/0164483 A1 | 6/2009 | Miles |
| 2009/0164641 A1 | 6/2009 | Rogers et al. |
| 2009/0164904 A1 | 6/2009 | Horowitz et al. |
| 2009/0165140 A1 | 6/2009 | Robinson et al. |
| 2009/0172728 A1 | 7/2009 | Shkedi et al. |
| 2009/0172746 A1 | 7/2009 | Aldrey et al. |
| 2009/0185723 A1 | 7/2009 | Kurtz et al. |
| 2009/0197524 A1 | 8/2009 | Haff et al. |
| 2009/0199236 A1 | 8/2009 | Barrett et al. |
| 2009/0199283 A1 | 8/2009 | Jain |
| 2009/0210899 A1 | 8/2009 | Lawrence-Apfelbaum et al. |
| 2009/0210902 A1 | 8/2009 | Slaney et al. |
| 2009/0216768 A1 | 8/2009 | Zwilling et al. |
| 2009/0231485 A1 | 9/2009 | Steinke |
| 2009/0232305 A1 | 9/2009 | Alessi et al. |
| 2009/0234738 A1 | 9/2009 | Britton et al. |
| 2009/0235312 A1 | 9/2009 | Morad et al. |
| 2009/0240821 A1 | 9/2009 | Juncker et al. |
| 2009/0248736 A1 | 10/2009 | Adelman et al. |
| 2009/0254554 A1 | 10/2009 | Hicken |
| 2009/0254572 A1 | 10/2009 | Redlich et al. |
| 2009/0259612 A1 | 10/2009 | Hanson |
| 2009/0271398 A1 | 10/2009 | Scherf et al. |
| 2009/0276313 A1 | 11/2009 | Wilhelm |
| 2009/0292610 A1 | 11/2009 | Quach et al. |
| 2009/0298480 A1 | 12/2009 | Khambete et al. |
| 2009/0299817 A1 | 12/2009 | Fok et al. |
| 2009/0299843 A1 | 12/2009 | Shkedi |
| 2009/0300109 A1 | 12/2009 | Porter |
| 2009/0307048 A1 | 12/2009 | Grossman |
| 2009/0327076 A1 | 12/2009 | Sinyagin et al. |
| 2009/0327496 A1 | 12/2009 | Klemets et al. |
| 2010/0007797 A1 | 1/2010 | Stojancic |
| 2010/0022231 A1 | 1/2010 | Heins et al. |
| 2010/0023392 A1 | 1/2010 | Merriman et al. |
| 2010/0023499 A1 | 1/2010 | Johnson et al. |
| 2010/0023582 A1 | 1/2010 | Pedersen et al. |
| 2010/0049711 A1 | 2/2010 | Singh et al. |
| 2010/0050220 A1 | 2/2010 | Rys et al. |
| 2010/0058380 A1 | 3/2010 | Yu et al. |
| 2010/0063970 A1 | 3/2010 | Kim |
| 2010/0071070 A1 | 3/2010 | Jawa et al. |
| 2010/0083303 A1 | 4/2010 | Redei et al. |
| 2010/0094897 A1 | 4/2010 | Sumrall et al. |
| 2010/0099359 A1 | 4/2010 | Lee et al. |
| 2010/0107189 A1 | 4/2010 | Steelberg et al. |
| 2010/0119208 A1 | 5/2010 | Davis et al. |
| 2010/0121891 A1 | 5/2010 | Zampiello |
| 2010/0131363 A1 | 5/2010 | Sievert et al. |
| 2010/0131847 A1 | 5/2010 | Sievert et al. |
| 2010/0131973 A1 | 5/2010 | Dillon et al. |
| 2010/0145938 A1 | 6/2010 | Boetje et al. |
| 2010/0146552 A1 | 6/2010 | Hassell et al. |
| 2010/0158391 A1 | 6/2010 | Cunningham et al. |
| 2010/0161424 A1 | 6/2010 | Sylvain |
| 2010/0174605 A1 | 7/2010 | Dean et al. |
| 2010/0175078 A1 | 7/2010 | Knudson et al. |
| 2010/0180216 A1 | 7/2010 | Bates et al. |
| 2010/0185513 A1 | 7/2010 | Anderson et al. |

(56) References Cited

U.S. PATENT DOCUMENTS

| | | |
|---|---|---|
| 2010/0199188 A1 | 8/2010 | Abu-Hakima et al. |
| 2010/0205166 A1 | 8/2010 | Boulter et al. |
| 2010/0205562 A1 | 8/2010 | de Heer |
| 2010/0205628 A1 | 8/2010 | Davis et al. |
| 2010/0226582 A1 | 9/2010 | Luo et al. |
| 2010/0228611 A1 | 9/2010 | Shenfield |
| 2010/0228625 A1 | 9/2010 | Priyadarshan et al. |
| 2010/0251278 A1 | 9/2010 | Agarwal et al. |
| 2010/0251289 A1 | 9/2010 | Agarwal et al. |
| 2010/0257052 A1 | 10/2010 | Zito et al. |
| 2010/0269138 A1 | 10/2010 | Krikorian et al. |
| 2010/0287026 A1 | 11/2010 | Smith |
| 2010/0287049 A1 | 11/2010 | Rousso et al. |
| 2010/0306193 A1 | 12/2010 | Pereira et al. |
| 2010/0306773 A1 | 12/2010 | Lee et al. |
| 2010/0306805 A1 | 12/2010 | Neumeier et al. |
| 2010/0306808 A1 | 12/2010 | Neumeier et al. |
| 2010/0311345 A1 | 12/2010 | Santori et al. |
| 2010/0318628 A1 | 12/2010 | Pacella et al. |
| 2010/0318917 A1 | 12/2010 | Holladay et al. |
| 2010/0319062 A1 | 12/2010 | Danieli et al. |
| 2010/0324992 A1 | 12/2010 | Birch |
| 2010/0325495 A1 | 12/2010 | Talla et al. |
| 2010/0325552 A1 | 12/2010 | Sloo et al. |
| 2011/0010737 A1 | 1/2011 | Bouazizi et al. |
| 2011/0029555 A1 | 2/2011 | Gao et al. |
| 2011/0029666 A1 | 2/2011 | Lopatecki et al. |
| 2011/0032334 A1 | 2/2011 | Raveendran et al. |
| 2011/0043652 A1 | 2/2011 | King et al. |
| 2011/0061073 A1 | 3/2011 | Nicholson et al. |
| 2011/0078753 A1 | 3/2011 | Christianson et al. |
| 2011/0082939 A1 | 4/2011 | Montemurro et al. |
| 2011/0082940 A1 | 4/2011 | Montemurro et al. |
| 2011/0088075 A1 | 4/2011 | Eyer |
| 2011/0099065 A1 | 4/2011 | Georgis et al. |
| 2011/0099609 A1 | 4/2011 | Malhotra et al. |
| 2011/0107385 A1 | 5/2011 | Hudson et al. |
| 2011/0119139 A1 | 5/2011 | Dean et al. |
| 2011/0122836 A1 | 5/2011 | Kim |
| 2011/0125586 A1 | 5/2011 | Evans |
| 2011/0131597 A1 | 6/2011 | Cera et al. |
| 2011/0136539 A1 | 6/2011 | Jain et al. |
| 2011/0138059 A1 | 6/2011 | Schleifer et al. |
| 2011/0145926 A1 | 6/2011 | Dalcher et al. |
| 2011/0154498 A1 | 6/2011 | Fissel et al. |
| 2011/0179010 A1 | 7/2011 | Lin et al. |
| 2011/0179447 A1 | 7/2011 | Harkness et al. |
| 2011/0191178 A1 | 8/2011 | Newberg et al. |
| 2011/0191352 A1 | 8/2011 | Jones et al. |
| 2011/0213881 A1 | 9/2011 | Stavenow et al. |
| 2011/0219322 A1 | 9/2011 | Ramamurthy et al. |
| 2011/0238379 A1 | 9/2011 | Misra et al. |
| 2011/0247044 A1 | 10/2011 | Jacoby |
| 2011/0251987 A1 | 10/2011 | Buchheit |
| 2011/0251992 A1 | 10/2011 | Bethlehem et al. |
| 2011/0258211 A1 | 10/2011 | Kalisky et al. |
| 2011/0265114 A1 | 10/2011 | Legrand |
| 2011/0265116 A1 | 10/2011 | Stern et al. |
| 2011/0270672 A1 | 11/2011 | Hillard et al. |
| 2011/0273625 A1 | 11/2011 | McMahon et al. |
| 2011/0274179 A1 | 11/2011 | Holden |
| 2011/0279445 A1 | 11/2011 | Murphy et al. |
| 2011/0283322 A1 | 11/2011 | Hamano |
| 2011/0289114 A1 | 11/2011 | Yu et al. |
| 2011/0289524 A1 | 11/2011 | Toner et al. |
| 2011/0289532 A1 | 11/2011 | Yu et al. |
| 2011/0289544 A1 | 11/2011 | Goosen et al. |
| 2011/0296303 A1 | 12/2011 | Duquene et al. |
| 2011/0304771 A1 | 12/2011 | Blanchard et al. |
| 2011/0310100 A1 | 12/2011 | Adimatyam et al. |
| 2011/0313856 A1 | 12/2011 | Cohen et al. |
| 2011/0314051 A1 | 12/2011 | Cavet et al. |
| 2011/0317885 A1 | 12/2011 | Leung et al. |
| 2011/0321003 A1 | 12/2011 | Doig et al. |
| 2011/0321109 A1 | 12/2011 | Hudson et al. |
| 2012/0011541 A1 | 1/2012 | McCarthy |
| 2012/0017240 A1 | 1/2012 | Shkedi |
| 2012/0023522 A1 | 1/2012 | Anderson et al. |
| 2012/0047277 A1 | 2/2012 | Keidar et al. |
| 2012/0054300 A1 | 3/2012 | Marchwicki et al. |
| 2012/0054440 A1 | 3/2012 | Doig et al. |
| 2012/0069131 A1 | 3/2012 | Abelow |
| 2012/0072291 A1 | 3/2012 | Bharat |
| 2012/0072420 A1 | 3/2012 | Moganti et al. |
| 2012/0076049 A1 | 3/2012 | Rudolf et al. |
| 2012/0084814 A1 | 4/2012 | Olague et al. |
| 2012/0086857 A1 | 4/2012 | Kim et al. |
| 2012/0089700 A1 | 4/2012 | Safruti et al. |
| 2012/0101907 A1 | 4/2012 | Dodda |
| 2012/0102515 A1 | 4/2012 | Ramaswamy |
| 2012/0109755 A1 | 5/2012 | Birch et al. |
| 2012/0124498 A1 | 5/2012 | Santoro et al. |
| 2012/0130822 A1 | 5/2012 | Patwa et al. |
| 2012/0130825 A1 | 5/2012 | Evans |
| 2012/0131095 A1 | 5/2012 | Luna et al. |
| 2012/0144416 A1 | 6/2012 | Wetzer et al. |
| 2012/0150944 A1 | 6/2012 | Steelberg et al. |
| 2012/0151015 A1 | 6/2012 | Plastina et al. |
| 2012/0151521 A1 | 6/2012 | Gilley et al. |
| 2012/0159542 A1 | 6/2012 | Minwalla |
| 2012/0163770 A1 | 6/2012 | Kaiser et al. |
| 2012/0163776 A1 | 6/2012 | Hassell et al. |
| 2012/0167001 A1 | 6/2012 | Ortiz et al. |
| 2012/0167132 A1 | 6/2012 | Mathews et al. |
| 2012/0174155 A1 | 7/2012 | Mowrey et al. |
| 2012/0191541 A1* | 7/2012 | Yang ............... G06Q 30/0241 705/14.53 |
| 2012/0191716 A1 | 7/2012 | Omoigui |
| 2012/0204093 A1* | 8/2012 | Habarakada ...... G06F 17/30893 715/234 |
| 2012/0207402 A1 | 8/2012 | Stojancic et al. |
| 2012/0209706 A1 | 8/2012 | Ramer et al. |
| 2012/0209726 A1 | 8/2012 | Dean et al. |
| 2012/0210224 A1 | 8/2012 | Wong et al. |
| 2012/0215622 A1 | 8/2012 | Ramer et al. |
| 2012/0233163 A1 | 9/2012 | Kirkpatrick |
| 2012/0240151 A1 | 9/2012 | Tapper |
| 2012/0245722 A1 | 9/2012 | Yamamura |
| 2012/0257110 A1 | 10/2012 | Amundsen |
| 2012/0260184 A1 | 10/2012 | Dawes et al. |
| 2012/0265616 A1 | 10/2012 | Cao et al. |
| 2012/0272134 A1 | 10/2012 | Steelberg et al. |
| 2012/0278825 A1 | 11/2012 | Tran et al. |
| 2012/0280908 A1 | 11/2012 | Rhoads et al. |
| 2012/0284746 A1 | 11/2012 | Evans et al. |
| 2012/0284757 A1 | 11/2012 | Rajapakse |
| 2012/0297406 A1 | 11/2012 | Bartholomay et al. |
| 2012/0303710 A1 | 11/2012 | Roberts et al. |
| 2012/0311074 A1 | 12/2012 | Arini et al. |
| 2012/0311629 A1 | 12/2012 | Zaslavsky et al. |
| 2012/0311702 A1 | 12/2012 | Krstic et al. |
| 2012/0315014 A1 | 12/2012 | Shuster |
| 2012/0317175 A1 | 12/2012 | Husain et al. |
| 2012/0317178 A1 | 12/2012 | Husain et al. |
| 2012/0317181 A1 | 12/2012 | Husain et al. |
| 2012/0324495 A1 | 12/2012 | Matthews et al. |
| 2012/0324566 A1 | 12/2012 | Baum et al. |
| 2013/0013665 A1 | 1/2013 | Sng et al. |
| 2013/0019262 A1 | 1/2013 | Bhatia et al. |
| 2013/0019268 A1 | 1/2013 | Fitzsimmons et al. |
| 2013/0036434 A1 | 2/2013 | Shkedi et al. |
| 2013/0041664 A1 | 2/2013 | McKoen et al. |
| 2013/0042262 A1 | 2/2013 | Riethmueller |
| 2013/0045681 A1 | 2/2013 | Dua |
| 2013/0051300 A1 | 2/2013 | He et al. |
| 2013/0055309 A1 | 2/2013 | Dittus |
| 2013/0060905 A1 | 3/2013 | Mickens et al. |
| 2013/0061259 A1 | 3/2013 | Raman et al. |
| 2013/0061267 A1 | 3/2013 | Cansino et al. |
| 2013/0078946 A1 | 3/2013 | Pecen et al. |
| 2013/0080242 A1 | 3/2013 | Alhadeff et al. |
| 2013/0085865 A1 | 4/2013 | Zhou et al. |
| 2013/0094423 A1 | 4/2013 | Wengrovitz et al. |
| 2013/0104160 A1 | 4/2013 | Beeson et al. |

(56) References Cited

U.S. PATENT DOCUMENTS

| | | | |
|---|---|---|---|
| 2013/0104232 A1 | 4/2013 | Johnson et al. | |
| 2013/0117782 A1 | 5/2013 | Mehta et al. | |
| 2013/0139209 A1 | 5/2013 | Urrabazo et al. | |
| 2013/0139210 A1 | 5/2013 | Huang et al. | |
| 2013/0151728 A1 | 6/2013 | Currier | |
| 2013/0185153 A1 | 7/2013 | Howcroft | |
| 2013/0185422 A1 | 7/2013 | Rogers et al. | |
| 2013/0202150 A1 | 8/2013 | Sinha et al. | |
| 2013/0205317 A1 | 8/2013 | Sinha et al. | |
| 2013/0205319 A1* | 8/2013 | Sinha et al. | 725/14 |
| 2013/0205348 A1 | 8/2013 | Hudson et al. | |
| 2013/0238702 A1 | 9/2013 | Sheth et al. | |
| 2013/0254884 A1 | 9/2013 | Dalcher et al. | |
| 2013/0263166 A1 | 10/2013 | Fleischman | |
| 2013/0290502 A1 | 10/2013 | Bilobrov et al. | |
| 2013/0297727 A1 | 11/2013 | Levy | |
| 2013/0311168 A1 | 11/2013 | Li | |
| 2013/0318157 A1 | 11/2013 | Harrison | |
| 2013/0326554 A1* | 12/2013 | Shkedi | 725/34 |
| 2013/0340011 A1 | 12/2013 | Rodriguez | |
| 2013/0340050 A1 | 12/2013 | Harrison | |
| 2014/0002247 A1 | 1/2014 | Harrison et al. | |
| 2014/0007155 A1 | 1/2014 | Vemparala et al. | |
| 2014/0007156 A1 | 1/2014 | Harrison et al. | |
| 2014/0007157 A1 | 1/2014 | Harrison et al. | |
| 2014/0007162 A1 | 1/2014 | Harrison | |
| 2014/0007187 A1 | 1/2014 | Harrison | |
| 2014/0007262 A1 | 1/2014 | Metsäpelto et al. | |
| 2014/0029847 A1 | 1/2014 | Frye et al. | |
| 2014/0032286 A1 | 1/2014 | Lansford et al. | |
| 2014/0040027 A1 | 2/2014 | Anderson et al. | |
| 2014/0040443 A1 | 2/2014 | Syu et al. | |
| 2014/0047480 A1 | 2/2014 | Knudson et al. | |
| 2014/0074621 A1* | 3/2014 | Chai et al. | 705/14.66 |
| 2014/0074839 A1 | 3/2014 | Popp et al. | |
| 2014/0082663 A1 | 3/2014 | Neumeier et al. | |
| 2014/0090008 A1 | 3/2014 | Li et al. | |
| 2014/0130076 A1 | 5/2014 | Moore et al. | |
| 2014/0141714 A1 | 5/2014 | Ghosh et al. | |
| 2014/0143043 A1 | 5/2014 | Wickramasuriya et al. | |
| 2014/0150006 A1 | 5/2014 | Vemparala et al. | |
| 2014/0181856 A1 | 6/2014 | Lewis | |
| 2014/0184827 A1 | 7/2014 | Chartrand | |
| 2014/0195584 A1 | 7/2014 | Harrison | |
| 2014/0195620 A1 | 7/2014 | Srinivasan et al. | |
| 2014/0195649 A1 | 7/2014 | Harrison | |
| 2014/0195690 A1 | 7/2014 | Harrison et al. | |
| 2014/0195934 A1 | 7/2014 | Harrison | |
| 2014/0196085 A1 | 7/2014 | Dunker et al. | |
| 2014/0201645 A1 | 7/2014 | Mo et al. | |
| 2014/0201769 A1 | 7/2014 | Neumeier et al. | |
| 2014/0201772 A1 | 7/2014 | Neumeier et al. | |
| 2014/0201773 A1 | 7/2014 | Neumeier et al. | |
| 2014/0201774 A1 | 7/2014 | Neumeier et al. | |
| 2014/0201787 A1 | 7/2014 | Neumeier et al. | |
| 2014/0218620 A1 | 8/2014 | Griffin et al. | |
| 2014/0229271 A1 | 8/2014 | Clapp et al. | |
| 2014/0237496 A1 | 8/2014 | Julian | |
| 2014/0244351 A1 | 8/2014 | Symons | |
| 2014/0244863 A1 | 8/2014 | Bradley et al. | |
| 2014/0280304 A1 | 9/2014 | Scherf et al. | |
| 2014/0282673 A1 | 9/2014 | Neumeier et al. | |
| 2014/0282693 A1* | 9/2014 | Soundararajan | H04N 21/435 725/32 |
| 2014/0282735 A1 | 9/2014 | Davis et al. | |
| 2014/0289315 A1 | 9/2014 | Harrison | |
| 2015/0003799 A1 | 1/2015 | Oostveen et al. | |
| 2015/0074526 A1 | 3/2015 | Brenner et al. | |
| 2015/0074703 A1 | 3/2015 | Cremer et al. | |
| 2015/0082331 A1 | 3/2015 | Neumeier et al. | |
| 2015/0089526 A1 | 3/2015 | Gordon | |
| 2015/0095972 A1 | 4/2015 | Sharma et al. | |
| 2015/0178280 A1 | 6/2015 | DiMaria et al. | |
| 2015/0181263 A1 | 6/2015 | Gordon | |
| 2015/0181268 A1 | 6/2015 | Navin et al. | |
| 2015/0181311 A1 | 6/2015 | Navin et al. | |
| 2015/0194151 A1 | 7/2015 | Jeyachandran et al. | |
| 2015/0195597 A1 | 7/2015 | Gordon | |
| 2015/0228306 A1 | 8/2015 | Roberts et al. | |
| 2015/0229690 A1 | 8/2015 | Raesig et al. | |
| 2015/0245090 A1 | 8/2015 | Davis et al. | |
| 2015/0262229 A1 | 9/2015 | Brenner et al. | |
| 2015/0302086 A1 | 10/2015 | Roberts et al. | |
| 2015/0331660 A1 | 11/2015 | Kalampoukas et al. | |
| 2015/0331661 A1 | 11/2015 | Kalampoukas et al. | |
| 2015/0331938 A1 | 11/2015 | Kalampoukas et al. | |
| 2015/0332669 A1 | 11/2015 | Kalampoukas et al. | |
| 2015/0332687 A1 | 11/2015 | Kalampoukas et al. | |
| 2015/0350725 A1 | 12/2015 | Zhu et al. | |
| 2015/0356178 A1 | 12/2015 | Scherf et al. | |
| 2015/0365456 A1 | 12/2015 | Harrison | |
| 2016/0007083 A1 | 1/2016 | Gurha | |
| 2016/0019598 A1 | 1/2016 | Harrison | |
| 2016/0019876 A1 | 1/2016 | Jeffrey et al. | |
| 2016/0110537 A1 | 4/2016 | Harrison | |
| 2016/0112770 A1 | 4/2016 | Harrison | |
| 2016/0124953 A1 | 5/2016 | Cremer et al. | |
| 2016/0139756 A1 | 5/2016 | Benson et al. | |
| 2016/0140122 A1 | 5/2016 | Harrison | |
| 2016/0182971 A1 | 6/2016 | Ortiz | |
| 2016/0196105 A1 | 7/2016 | Vartakavi et al. | |
| 2016/0196270 A1 | 7/2016 | DiMaria et al. | |
| 2016/0196344 A1 | 7/2016 | Cremer et al. | |
| 2016/0217799 A1 | 7/2016 | Han et al. | |
| 2016/0241540 A1 | 8/2016 | Jeffrey et al. | |
| 2016/0267180 A1 | 9/2016 | Harron et al. | |
| 2016/0323533 A1 | 11/2016 | Nagorski et al. | |
| 2016/0373197 A1 | 12/2016 | Brenner et al. | |

FOREIGN PATENT DOCUMENTS

| | | |
|---|---|---|
| CA | 2884534 A1 | 3/2014 |
| CN | 1726489 A | 1/2006 |
| CN | 101147378 A | 3/2008 |
| CN | 101622599 A | 1/2010 |
| CN | 101909201 B | 6/2013 |
| DE | 69815695 T2 | 6/2004 |
| DE | 602004008936 T2 | 6/2008 |
| EP | 1010098 A2 | 6/2000 |
| EP | 1010098 B1 | 6/2003 |
| EP | 1324567 A2 | 7/2003 |
| EP | 1324567 A3 | 8/2003 |
| EP | 1347661 A1 | 9/2003 |
| EP | 1410380 A2 | 4/2004 |
| EP | 1421521 A2 | 5/2004 |
| EP | 1573462 A3 | 10/2005 |
| EP | 1592198 A1 | 11/2005 |
| EP | 1605416 A1 | 12/2005 |
| EP | 1779659 A1 | 5/2007 |
| EP | 1803270 A1 | 7/2007 |
| EP | 1934828 A2 | 6/2008 |
| EP | 1362485 B1 | 8/2008 |
| EP | 1934828 A4 | 10/2008 |
| EP | 2001583 A2 | 12/2008 |
| EP | 1550297 B1 | 3/2009 |
| EP | 2100216 A2 | 9/2009 |
| EP | 1314110 B1 | 10/2009 |
| EP | 2100216 A4 | 12/2009 |
| EP | 2136306 A1 | 12/2009 |
| EP | 1324567 B1 | 1/2010 |
| EP | 2145411 A2 | 1/2010 |
| EP | 2169854 A1 | 3/2010 |
| EP | 1410380 B1 | 4/2010 |
| EP | 1797552 B1 | 4/2010 |
| EP | 2206114 A1 | 7/2010 |
| EP | 2001583 A4 | 9/2010 |
| EP | 2226757 A1 | 9/2010 |
| EP | 2206114 A4 | 7/2012 |
| EP | 1887754 B1 | 12/2012 |
| EP | 2541961 A2 | 1/2013 |
| EP | 2136306 B1 | 3/2013 |
| EP | 2541961 A3 | 4/2013 |
| EP | 1969810 B2 | 8/2013 |
| EP | 2520084 A4 | 11/2013 |

(56) References Cited

FOREIGN PATENT DOCUMENTS

| | | |
|---|---|---|
| EP | 2285066 B1 | 5/2014 |
| EP | 2747370 A1 | 6/2014 |
| EP | 2200258 B1 | 11/2014 |
| EP | 2895971 A2 | 7/2015 |
| EP | 2944051 A1 | 11/2015 |
| EP | 2895971 A4 | 5/2016 |
| EP | 3084646 A1 | 10/2016 |
| EP | 2944051 A4 | 11/2016 |
| EP | 3090330 A1 | 11/2016 |
| EP | 3090429 A1 | 11/2016 |
| EP | 3117390 A1 | 1/2017 |
| GB | 2457694 A | 8/2009 |
| JP | 2007220137 A | 8/2007 |
| JP | 2007257820 A | 10/2007 |
| JP | 2007280382 A | 10/2007 |
| JP | 2009075603 A | 4/2009 |
| JP | 2013013092 A | 1/2013 |
| KR | 20030005279 A | 1/2003 |
| KR | 20040021684 A | 3/2004 |
| KR | 20040024870 A | 3/2004 |
| KR | 20040029452 A | 4/2004 |
| KR | 20040086350 A | 10/2004 |
| KR | 20050046815 A | 5/2005 |
| KR | 20050061566 A | 6/2005 |
| KR | 20050061594 A | 6/2005 |
| KR | 20050086470 A | 8/2005 |
| KR | 20050113614 A | 12/2005 |
| KR | 20050117558 A | 12/2005 |
| KR | 20070095282 A | 9/2007 |
| KR | 20080043358 A | 5/2008 |
| KR | 100961461 B1 | 6/2010 |
| KR | 101487639 B1 | 1/2015 |
| KR | 20150054861 A | 5/2015 |
| KR | 20150106904 A | 9/2015 |
| KR | 1020160101979 A | 8/2016 |
| KR | 20160135751 A | 11/2016 |
| WO | 1995012278 A1 | 5/1995 |
| WO | 2000052929 A1 | 9/2000 |
| WO | 2000054504 A1 | 9/2000 |
| WO | 2001044992 A1 | 6/2001 |
| WO | 2001082625 A1 | 11/2001 |
| WO | 2001089213 A1 | 11/2001 |
| WO | 2001089217 A1 | 11/2001 |
| WO | 200231742 A2 | 4/2002 |
| WO | 2002061652 A2 | 8/2002 |
| WO | 2003009277 A2 | 1/2003 |
| WO | 2003012695 A2 | 2/2003 |
| WO | 2003019560 A2 | 3/2003 |
| WO | 2003025762 A1 | 3/2003 |
| WO | 2003009277 A3 | 9/2003 |
| WO | 2003019560 A3 | 1/2004 |
| WO | 2003012695 A3 | 3/2004 |
| WO | 2004040416 A2 | 5/2004 |
| WO | 2004044820 A1 | 5/2004 |
| WO | 2005041455 A1 | 5/2005 |
| WO | 2005050620 A1 | 6/2005 |
| WO | 2004040416 A3 | 8/2005 |
| WO | 2005125198 A2 | 12/2005 |
| WO | 2006018790 A1 | 2/2006 |
| WO | 2006041928 A1 | 4/2006 |
| WO | 2007022533 A2 | 2/2007 |
| WO | 2007022533 A3 | 6/2007 |
| WO | 2007103583 A2 | 9/2007 |
| WO | 2007114796 A1 | 10/2007 |
| WO | 2008029188 A1 | 3/2008 |
| WO | 2007103583 A3 | 5/2008 |
| WO | 2008052205 A2 | 5/2008 |
| WO | 2008086104 A2 | 7/2008 |
| WO | 2008086104 A3 | 8/2008 |
| WO | 2008112858 A1 | 9/2008 |
| WO | 2008131247 A1 | 10/2008 |
| WO | 2008137756 A2 | 11/2008 |
| WO | 2009023647 A1 | 2/2009 |
| WO | 2009042858 A1 | 4/2009 |
| WO | 2009091338 A1 | 7/2009 |
| WO | 2009114622 A2 | 9/2009 |
| WO | 2009131861 A2 | 10/2009 |
| WO | 2009132084 A1 | 10/2009 |
| WO | 2008137756 A3 | 12/2009 |
| WO | 2009150425 A2 | 12/2009 |
| WO | 2010022000 A2 | 2/2010 |
| WO | 2010046123 A1 | 4/2010 |
| WO | 2010054222 A1 | 5/2010 |
| WO | 2010072986 A2 | 7/2010 |
| WO | 2010129693 A1 | 11/2010 |
| WO | 2010151421 A1 | 12/2010 |
| WO | 2011011002 A1 | 1/2011 |
| WO | 2011030231 A1 | 3/2011 |
| WO | 2011090540 A2 | 7/2011 |
| WO | 2011090541 A2 | 7/2011 |
| WO | 2012005994 A1 | 1/2012 |
| WO | 2012013893 A1 | 2/2012 |
| WO | 2012021538 A1 | 2/2012 |
| WO | 2012028976 A1 | 3/2012 |
| WO | 2012051115 A1 | 4/2012 |
| WO | 2012109666 A1 | 8/2012 |
| WO | 2012120253 A1 | 9/2012 |
| WO | 2012151026 A1 | 11/2012 |
| WO | 2012154541 A1 | 11/2012 |
| WO | 2013028899 A1 | 2/2013 |
| WO | 2013032787 A1 | 3/2013 |
| WO | 2013068619 A1 | 5/2013 |
| WO | 2013089674 A1 | 6/2013 |
| WO | 2013147587 A1 | 10/2013 |
| WO | 2014042826 A2 | 3/2014 |
| WO | 2014052015 A1 | 4/2014 |
| WO | 2014042826 A3 | 5/2014 |
| WO | 2014107311 A1 | 7/2014 |
| WO | 2014142758 A1 | 9/2014 |
| WO | 2014145929 A1 | 9/2014 |
| WO | 2014145938 A1 | 9/2014 |
| WO | 2014145947 A1 | 9/2014 |
| WO | 2015094558 A1 | 6/2015 |
| WO | 2015102921 A1 | 7/2015 |
| WO | 2015103384 A1 | 7/2015 |
| WO | 2015138601 A1 | 9/2015 |
| WO | 2015167901 A1 | 11/2015 |
| WO | 2015183914 A1 | 12/2015 |
| WO | 2016018472 A2 | 2/2016 |
| WO | 2016018472 A3 | 3/2016 |
| WO | 2016109500 A1 | 7/2016 |
| WO | 2016109553 A2 | 7/2016 |
| WO | 2016109682 A2 | 7/2016 |
| WO | 2016109553 A3 | 8/2016 |
| WO | 2016109682 A3 | 9/2016 |

OTHER PUBLICATIONS

"Automated Content Recognition creating content aware ecosystems", in CSI Magazine in Sep. 2012 (pp. 16) http://www.csimagazine.com/csi/whitepapers/ACR%20Creating%20%20content-aware%20ecosystems%20-Civolution%20White%20Paper%20-%20Sept%202012.pdf.

"A Confidence Based Recognition System for TV Commercial Extraction", in 2008 by Yijun Li et al. (pp. 8) http://crpit.com/confpapers/CRPITV75Li.pdf.

"Secure Browsing with Ceedo", Ceedo Flexible computing (pp. 2).

"Sandboxes and Silver Bullets: Vendors Promote New/Old Detection Techniques to Stop Zero-Day Threats", IT Current Analysis Connection Blogs, Mar. 29, 2013 by Paula Musich (p. 1). http://itcblogs.currentanalysis.com/2013/03/29/sandboxes-and-silver-bullets-vendors-promote-newold-detection-techniques-to-stop-zero-day-threats/.

"Introduction to security" (pp. 7) http://help.adobe.com/en_US/flex/using/WS2db454920e96a9e51e63e3d11c0bf6167e-7fff.html#WS2db454920e96a9e51e63e3d11c0bf6167e-7ff9.

"Screenshot of Wikipedia page of Samba TV", Jan. 5, 2015 (pp. 2) http://en.wikipedia.org/wiki/Samba_TV.

"Screenshot of Wikipedia page of Smart TV", Jan. 5, 2015 (pp. 4) http://en.wikipedia.org/wiki/Smart_TV.

(56) References Cited

OTHER PUBLICATIONS

"Screenshot of Wikipedia page of Interactive television", From Wikipedia, Jan. 5, 2015 (pp. 8) http://en.wikipedia.org/wiki/Interactive_television.
"Screenshot of Wikipedia page of Social television", From Wikipedia, Jan. 5, 2015 (pp. 3) http://en.wikipedia.org/wiki/Social_television.
"Screenshot of Wikipedia page of Enhanced TV", From Wikipedia, Jan. 5, 2015 (p. 1) http://en.wikipedia.org/wiki/Enhanced_TV.
"Screenshot of Wikipedia page of Digital video fingerprinting", From Wikipedia, Jan. 5, 2015 (pp. 4) http://en.wikipedia.org/wiki/Digital_video_fingerprinting.
"Screenshot of Wikipedia page of Second screen", From Wikipedia, Jan. 5, 2015 (pp. 3) http://en.wikipedia.org/wiki/Second_screen.
Reverse Sandboxing with SafeCentral, SafeCentral (pp. 3) http://www.safecentral.com/pdfs/ReverseSandboxing.pdf.
"Collect, Manage, and Analyze everything occurring on your network", RSA Security Analytics, Detect & Investigate Threats. (pp. 5) http://www.emc.com/collateral/data-sheet/security-analytics-infrastructure-ds.pdf.
"Metazen—metadata capture for metagenomes", Standards in Genomic Sciences, by Jared Bischof et al. (pp. 6) http://www.standardsingenomics.com/content/pdf/1944-3277-9-18.pdf.
"Semantic Annotation of Images and Videos for Multimedia Analysis", by Stephan Bloehdorn et al. (pp. 15) http://image.ntua.gr/papers/345.pdf.
"Architecture for Interoperability of Services between an ACAP Receiver and Home Networked Devices", Jan. 15, 2006, by Yu-Seok Bae et al. (pp. 6).
"Smart SoftPhone Device for Networked AudioVisual QoS/QoE Discovery & Measurement", Digital Media Laboratory, Information and Communications University,Republic of Korea, by Jinsul Kim, (pp. 23) http://cdn.intechopen.com/pdfs-wm/5446.pdf.
"Market Potential for Interactive Audio-visual Media", IEEE Xplore, by Andra Leurdijk et al., (p. 1) http://ieeexplore.ieee.org/xpl/login.jsp?tp=&arnumber=1592082&url=http%3A%2F%2Fieeexplore.ieee.org%2Fxpls%2Fabs_all.jsp%3Farnumber%3D1592082.
"Design of a multi-sender 3D videoconferencing application over an end system multicast protocol", '03 Proceedings of the eleventh ACM international conference on Multimedia, New York, NY, USA, 2003 by Mojtaba Hosseini et al., (p. 1) http://dl.acm.org/citation.cfm?id=957119.
"Cisco Medianet Data Sheet", Cisco 3900 Series Integrated Services Routers, (pp. 8) http://www.cisco.com/c/en/us/products/collateral/routers/3900-series-integrated-services-routers-isr/data_sheet_c78-612429.html.
"Delivery of Personalized and Adaptive Content to Mobile Devices: A Framework and Enabling Technology", Communications of the Association for Information Systems (vol. 12, 2003)183-202, by D. Zhang, (pp. 22) http://aisel.aisnet.org/cgi/viewcontent.cgi?article=3178&context=cais.
"Single Sign-On for Java Web Start Applications Using MyProxy", by Terry Fleury et al. (pp. 7) http://grid.ncsa.illinois.edu/papers/sws-myproxy-jws.pdf.
"MonALISA : A Distributed Monitoring Service Architecture", CHEP03, La Jolla, California, Mar. 24-28, 2003 by H.B. Newman et al. (pp. 8) http://monalisa.caltech.edu/documentation/MOET001.pdf.
"Exploratory geospatial analysis using GeoVISTA Studio: from a desktop to the Web", IEEE Xplore, Dec. 3-6, 2001, by M. Takatsuka et al. (p. 1) http://ieeexplore.ieee.org/xpl/login.jsp?tp=&arnumber=996715&url=http%3A%2F%2Fieeexplore.ieee.org%2Fxpls%2Fabs_all.jsp%3Farnumber%3D996715.
"Comprehensive Multi-platform Collaboration", Department of Computer Science, Columbia University, by kundan Singh et al. (pp. 36) http://www.cs.columbia.edu/~library/TR-repository/reports/reports-2003/cucs-027-03.pdf.
"Privacy-Preserving Remote Diagnostics", The University of Texas at Austin, by Justin Brickell et al. (pp. 10) https://www.cs.utexas.edu/~shmat/shmat_ccs07.pdf.

"Supporting Dynamic Ad hoc Collaboration Capabilities", LBNL, Berkeley, CA 94720, USA, by D. Agarwal et al. (pp. 6) http://arxiv.org/ftp/cs/papers/0307/0307037.pdf.
"A Framework for Classifying Peer-to-Peer Technologies", IEEE Xplore, May 21-24, 2002, by K. Kant et al. (p. 1) http://ieeexplore.ieee.org/xpl/login.jsp?tp=&arnumber=1540491&url=http%3A%2F%2Fieeexplore.ieee.org%2Fiel5%2F10335%2F32898%2F01540491.pdf%3Farnumber%3D1540491.
"TV Retargeting", Market View, wywy—Maximizing TV Advertising ROI, Dec. 31, 2015 (pp. 2) http://wywy.com/market-view/tv-retargeting/.
"The New Age of Second Screen: Enabling Interaction", admonsters webpage, Jun. 5, 2013, Joshua R. Weaver (pp. 3) https://www.admonsters.com/blog/second-screen-enabling-interaction.
"Complaint for Patent Infringement", Case 2:15-cv-01725-RWS Document 1, Nov. 6, 2015 (pp. 7).
"Merriam-Webster, Launch", 2015.
"OpenX Ad Server: Beginner's Guide", Packt Publishing by Murat Yilmaz (pp. 26) https://www.packtpub.com/sites/default/files/0202_OpenX%20Ad%20Server%20Beginner's%20Guide_SampleChapter.pdf.
"HTML & CSS: The Complete Reference", The McGraw-Hill Companies, 2010 by Thomas A. Powell (pp. 857) http://www.pdfiles.com/pdf/files/English/Web_Apps_Programming_&_Internet/HTML_&_CSS_The_Complete_Reference.pdf.
"Web Services Essentials", O'Reilly, Feb. 2002 by Ethan Cerami (pp. 286) http://spurrier.gatorglory.com/PDFs/O'Reilly%20-%20Web%20Services%20Essentials.pdf.
"UPnP Device Architecture 1.0", UPnP Forum, Oct. 15, 2008 (pp. 81) http://upnp.org/specs/arch/UPnP-arch-DeviceArchitecture-v1.0.pdf.
"Mac OS X Snow Leopard: The Missing Manual", O'Reilly Media, Inc., 2009 by David Pogue (pp. 903) http://crypto.cs.mcgill.ca/~simonpie/webdav/ipad/EBook/MacOSX/Mac%20OS%20X%20Snow%20Leopard%20The%20Missing%20Manual.pdf.
"The Common Object Request Broker: Architecture and Specification Revision 2.0", Feb. 1997 (pp. 634) http://www.omg.org/spec/CORBA/2.0/PDF.
"Internet: The Complete Reference", Tata McGraw-Hill Education Pvt. Ltd., 2002 by Margaret Levine Young http://www.abebooks.com/Internet-Complete-Reference-Second-Edition-Margaret/5122896620/bd.
"HTML 4.0 Sourcebook", John Wiley & Sons, Apr. 1998 by Ian S. Graham (pp. 656) http://www.wiley.com/WileyCDA/WileyTitle/productCd-047127249.html.
"Zero Configuration Networking: The Definitive Guide", O'Reilly Media, Dec. 2005 by Daniel H Steinberg et al. (pp. 254) http://shop.oreilly.com/product/9780596101008.do#tab_04_2.
https://web.archive.org/web/20110722022038/http://www.flingo.tv/.
https://web.archive.org/web/20120616002448/http://www.flingo.tv/.
https://web.archive.org/web/20130423033122/http://flingo.tv/.
https://web.archive.org/web/20101015033305/http://flingo.org/.
https://web.archive.org/web/20110609062427/http://www.flingo.org/.
"Security in the Large: Is Java's Sandbox Scalable?", HP Hewlett Packard Apr. 1998, by Qun Zhong et al.(pp. 9) http://www.hpl.hp.com/techreports/98/HPL-98-79.pdf.
"For Developers", Flingo Article, Oct. 2010, by Flingo https://web.archive.org/web/20101028221214/flingo.org/developers.html.
"Anomaly Detection in Dynamic Execution Environments", NSPW 2002, by Hajime Inoue et al. (pp. 9) http://www.nspw.org/papers/2002/nspw2002-inoue.pdf.
"iPhone Security Analysis", Department of Computer Science San Jose State University, May 2008, by Vaibhav Pandya. (pp. 44) http://www.cs.sjsu.edu/faculty/stamp/students/pandya_vaibhav.pdf.
"I, Me and My Phone: Identity and Personalization using Mobile Devices", HP Invest, Nov. 2007 by Riddhiman Ghosh et al. (pp. 14) http://www.hpl.hp.com/techreports/2007/HPL-2007-184.pdf.
"Extending the web to support personal network services", SAC '13, Mar. 2013, by John Lyle et al. (pp. 6) https://www.cs.ox.ac.uk/files/5273/sac2013.pdf.
"Java and Java Virtual Machine Security Vulnerabilities and their Exploitation Techniques", Black Hat Briefings, Singapore, Oct.

(56) References Cited

OTHER PUBLICATIONS 2002, by Delirium. (pp. 91) http://www.blackhat.com/presentations/bh-asia-02/LSD/bh-asia-02-lsd.pdf.
"Shazam Announces Application for iPhone", by Shazam, Jul. 2008. http://news.shazam.com/pressreleases/shazam-announces-application-for-iphone-890432.
"Shazam Launches Android Application Integrated with MySpace and Amazon MP3", by Shazam, Oct. 2008. http://news.shazam.com/pressreleases/shazam-launches-android-application-integrated-with-myspace-and-amazon-mp3-890456.
"The Shazam music recognition service" ,Communications of the ACM—Music information retrieval, Aug. 2006, by Shazam. https://www.researchgate.net/publication/220423945_The_Shazam_music_recognition_service.
"An Industrial-Strength Audio Search Algorithm", International Conference on Music Information Retrieval, 2003, by Avery Wang. https://www.ee.columbia.edu/~dpwe/papers/Wang03-shazam.pdf.
"It Just Works: UPnP in the Digital Home", The Journal of Spontaneous Networking, Oct. 2004, by Michael Jeronimo. http://www.artima.com/spontaneous/upnp_digihome.html.
"Data-Confined HTML5 Applications", European Symposium on Research in Computer Security, London Mar. 2013, by Devdatta Akhawe (pp. 18) http://devd.me/papers/dcs-esorics.pdf.
"A Component-based Software Infrastructure for Ubiquitous Computing", Parallel and Distributed Computing, 2005, by Areski Flissi et al. (pp. 22) http://www.lifl.fr/ispdc2005/presentations/flissi_ispdc_slides.pdf.
"A robust image fingerprinting system using the Radon transform", Signal Processing: Image Communication 19 (2004) 325-339, May 2004, by Jin Seo et al. http://www.123seminarsonly.com/Seminar-Reports/027/60224236-Finger-Printing.pdf .
"An Authentication and Authorization Architecture for Jini Services", CiteSeer, by Oct. 2000, by Thomas Schoch et al. http://www.vs.inf.ethz.ch/publ/papers/da-schoch.pdf.
"Analysis and Prediction of Set-Top-Box Reliability in Multi-Application Environments using Artificial Intelligence Techniques", Spring Technical Forum, 2004,Louis Slothouber et al. (pp. 9) file:///C:/Users/User/Downloads/2004-analysis-and-prediction-of-set-top-box-reliability-in-multi-application-environments-using-artificial-intelligence-techniques%20(1).pdf.
"Artificial Intelligence in Cable TV Applications", Advancing Technology's Agends, Louis Slothouber et al., 2003, (pp. 8) file:///C:/Users/User/Downloads/2003-artifcial-intelligence-in-cable-tv-applications%20(2).pdf.
"Exploiting Cross Context Scripting Vulnerabilities in Firefox", Security-Assessment.com Addendum, Apr. 2010, by Nick Freeman et al. (pp. 8) http://www.security-assessment.com/files/whitepapers/Exploiting_Cross_Context_Scripting_vulnerabilities_in_Firefox.pdf.
"Design and Implementation of Fingerprinting-based Broadcasting Content Identification System", Creative Content Research Laboratory, ETRI (Electronics and Telecommunication Research Institute), Feb. 2014, by Jihyun Park et al. http://www.icact.org/upload/2014/0249/20140249_biography.pdf.
"Efficient Software-Based Fault Isolation", SOSP '93 Proceedings of the fourteenth ACM symposium on Operating systems principles, Dec. 1993, by Robert Wahbe et al. (pp. 14) https://crypto.stanford.edu/cs155/papers/sfi.pdf.
"Java and .NET Security",Secure Computer Systems, Oct. 2005 by Martin Russold et al. (pp. 6) https://www.it.uu.se/edu/course/homepage/sakdat/ht05/assignments/pm/programme/Java_and_NET.pdf.
"JAVA™ Web Start Overview", White Paper, May 2005, by Sun Microsystems, Inc. (pp. 14) http://www.oracle.com/technetwork/java/javase/jws-white-paper-150004.pdf.
"Programming the Grid with gLite", Enabling Grids for E-Science, Mar. 2006, by Laure et al. (pp. 18). http://cds.cern.ch/record/936685/files/egee-tr-2006-001.pdf.

"Shazam Turns Up the Volume on Mobile Music", Nov. 2007, by Shazam. http://news.shazam.com/pressreleases/shazam-turns-up-the-volume-on-mobile-music-890300.
"The Evolution of the JAVA Security Model", International Conference on Computer Systems and Technologies—CompSysTech' 2005, by Nikolaj Cholakov et al. (pp. 6) http://ecet.ecs.uni-ruse.bg/cst05/Docs/cp/SIII/IIIB.12.pdf.
"The iPhone Developer's Cookbook—Building Applications with the iPhone SDK", Developer's Library, 2008, by Erica Sadun. (pp. 380) http://www.ebooksbucket.com/uploads/itprogramming/iosappdevelopment/The_iPhone_Developers_Cookbook.pdf.
"Towards Distributed Service Discovery in Pervasive Computing Environments", IEEE Transactions on Mobile Computing, vol. 5, No. , pp. 97-112, Feb. 2006, by Dipanjan Chakraborty. https://www.computer.org/csdl/trans/tm/2006/02/h0097-abs.html.
"Twisted Python and Bonjour", Indelible.org, Jan. 2009, by Parise. http://www.indelible.org/ink/twisted-bonjour/.
"UPnP in Digital Home Networking", QuEST, by Quest Global Services, 2015. (pp. 7). https://www.quest-global.com/wp-content/uploads/2015/08/UPnP-in_Digital_Home_Networking.pdf.
"Cross Context Scripting with Firefox", Security-Assessment.com White Paper, Apr. 2010, by Roberto Liverani (pp. 24) http://www.security-assessment.com/files/documents/whitepapers/Cross_Context_Scripting_with_Firefox.pdf.
"Vulnerabilities and Threats to Mobile Device Security From a Practitioner's Point of View", Issues in Information Systems, vol. XII, No. 2, pp. 181-193, 2011, by Joseph Laverty et al.. (pp. 13) http://iacis.org/iis/2011/181-193_AL2011_1693.pdf.
"Android (operating system)", Sep. 2008, by Spice. (pp. 9) "http://www.si2imobility.com/spicemobiles/pdf/Support-%20FAQs/Android.pdf".
"Flingo is about to make your smart TV even smarter", Jul. 7, 2011, by Ryan Lawler (pp. 6) https://gigaom.com/2011/07/07/flingo-launch/.
"The TV That Watches You", Aug. 19, 2011, by Tom Simonite (pp. 5) https://www.technologyreview.com/s/425081/the-tv-that-watches-you/.
"WAP Architecture" by Wireless Application Protocol Forum, Published on Jul. 12, 2001 (pp. 24) http://www.openmobilealliance.org/tech/affiliates/wap/wap-210-waparch-20010712-a.pdf.
"EFI Framework" by Wireless Application Protocol Forum, Published on Dec. 17, 2001 (pp. 50) http://www.openmobilealliance.org/tech/affiliates/wap/wap-231-efi-20011217-a.pdf.
"Push OTA Protocol" by Wireless Application Protocol Forum, Published on Apr. 25, 2001 (pp. 44) http://www.openmobilealliance.org/tech/affiliates/wap/wap-235-pushota-20010425-a.pdf.
"Pandora on the iPhone" uploaded on YouTube on Jul. 14, 2008 by Radiopandora, found online on May 24, 2017 (pp. 28) https://www.youtube.com/watch?v=tNMSntXtPc0.
"Pioneer Brings Pandora into Your Car" uploaded on YouTube on Aug. 4, 2010 by Pioneerelectronics, found online on May 24, 2017 (pp. 16) https://www.youtube.com/watch?v=HdyOKPhBoi4.
"iDA-X305S: Control Pandora from your dash" uploaded on YouTube on Mar. 26, 2010 by AlpineTV, found online on May 24, 2017 (pp. 14) https://www.youtube.com/watch?v=8TkWI_ILVzU.
"Sync + Retarget, Extend your TV campaign to all screen in real-time" by Samba TV, found online on May 24, 2017 (pp. 4) https://samba.tv/advertising/sync-retarget/.
"Pandora system everywhere", by Pandora, found online on May 24, 2017 (pp. 9) https://www.pandora.com/everywhere.
Title: Content Interaction Methods and Systems Employing Portable Devices, U.S. Appl. No. 61/112,573, Name of inventor: Bruce L. Davis, filed Nov. 7, 2008.
Title: Second Screen Methods and Arrangements, U.S. Appl. No. 61/152,226, Name of inventor: Bruce L. Davis, filed Feb. 12, 2009.
Title: Second Screen Methods and Arrangements, U.S. Appl. No. 61/160,660, Name of inventor: Bruce L. Davis, filed Mar. 16, 2009.
Title: Second Screen Methods and Arrangements, U.S. Appl. No. 61/167,828, Name of inventor: Bruce L. Davis, filed Apr. 8, 2009.
"Inglorious Installers: Security in the Application Marketplace", by Jonathan Anderson et al., Published on Jun. 7, 2010 (pp. 46) https://www.cl.cam.ac.uk/~fms27/papers/2010-AndersonBonStainglourious.pdf.

(56) References Cited

OTHER PUBLICATIONS

"Shazam Launches Android Application Integrated with MySpace and Amazon MP3", by Shazam, Published on Apr. 28, 2014 (pp. 2) https://www.slideshare.net/warychum9099/shazam-launches-android-application-integrated-with-myspace-and-amazon-mp3.

"Fingerprinting—More than Just Piracy Detection", by Ken Pyle, Published on Sep. 7, 2010 (p. 1) http://viodi.com/2010/09/07/fingerprinting/.

"Audio-Video Content Fingerprinting for Smart TV and Synchronous Mobile Content Identification", by Mihailo Stojancic, Published on Jun. 28, 2011 (pp. 50) http://sites.ieee.org/scv-ces/files/2015/06/Zeitera_IEEE_CE_SantaClara-5.pdf.

"New Tech Offers Ce Suppliers Ad Opportunities in Linear TV", by Screen Plays Magazine, Published on Oct. 20, 2010 (p. 1) http://www.screenplaysmag.com/2010/10/20/new-tech-offers-ce-suppliers-ad-opportunities-in-linear-tv/.

"Spate of ACR Initiatives Brings New Efficiencies to Ads & Apps", by Screen Plays Magazine, Published on May 4, 2011 (p. 2) http://www.screenplaysmag.com/2011/05/10/spate-of-acr-initiatives-brings-new-efficiencies-to-ads-apps/.

"Ensequence and Zeitera Partner to Enable TV Programmers and Advertisers to Deploy Synchronized Interactive Experiences on Tablets and Smartphones", by Ensequence, Published on Aug. 8, 2011 (pp. 2) http://www.marketwired.com/press-release/ensequence-zeitera-partner-enable-tv-programmers-advertisers-deploy-synchronized-1546996.htm.

"Ensequence Targets Second-Screen Apps With Zeitera", by Todd Spangler, Published on Aug. 8, 2011 (pp. 2) https://www.multichannel.com/news/ensequence-targets-second-screen-apps-zeitera-258185.

\* cited by examiner

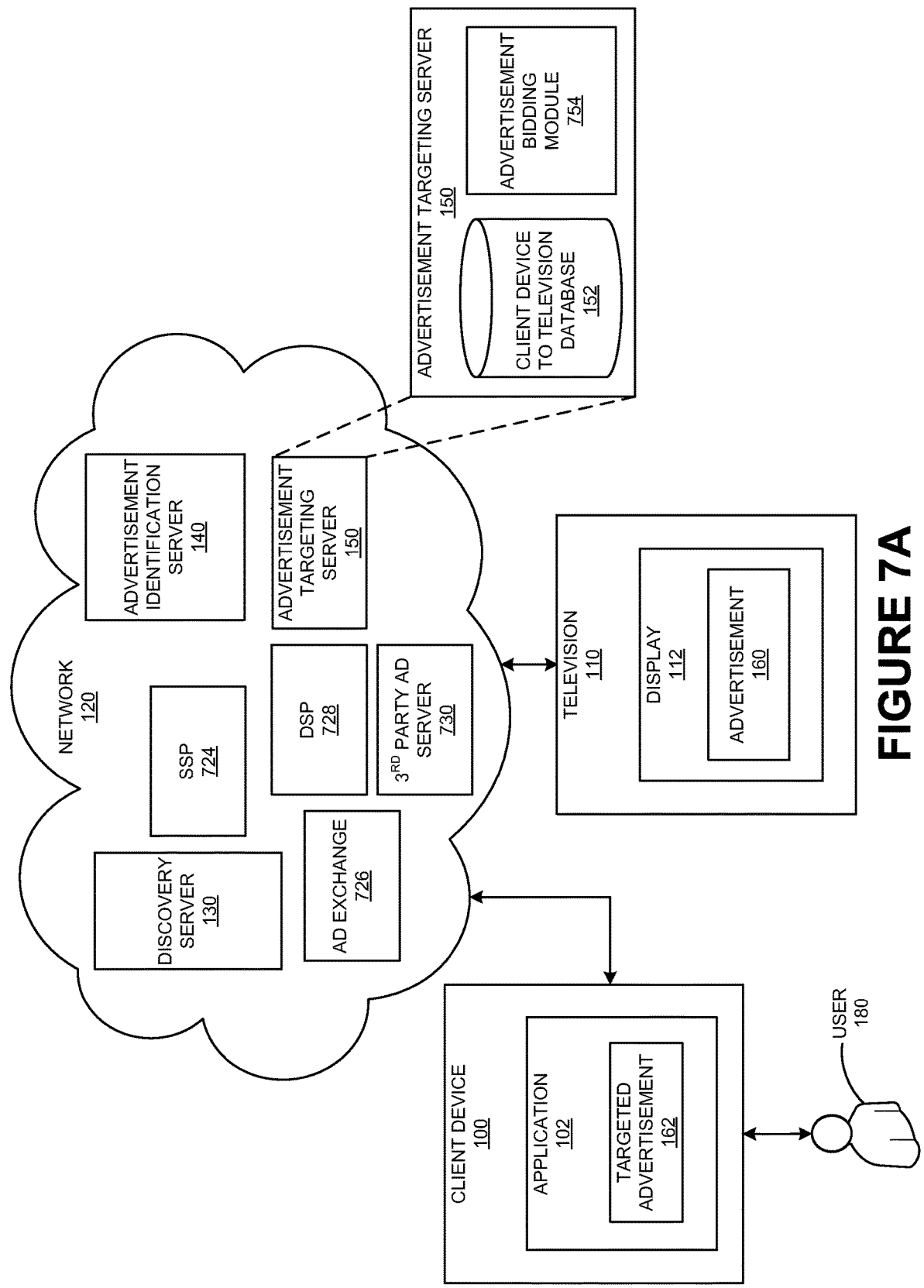

RELEVANT ADVERTISEMENT GENERATION BASED ON A USER OPERATING A CLIENT DEVICE COMMUNICATIVELY COUPLED WITH A NETWORKED MEDIA DEVICE

CLAIM OF PRIORITY

This disclosure claims priority to, and incorporates herein by reference the entire specification of U.S. Provisional Patent application No. 61/118,286 filed Nov. 26, 2008 and titled DISCOVERY, ACCESS CONTROL, AND COMMUNICATION WITH NETWORKED SERVICES FROM WITHIN A SECURITY SANDBOX.

This disclosure claims priority to, and incorporates herein by reference the entire specification of U.S. Continuation application Ser. No. 13/470,814 filed May 14, 2012 and titled DISCOVERY, ACCESS CONTROL, AND COMMUNICATION WITH NETWORKED SERVICES FROM WITHIN A SECURITY SANDBOX.

This disclosure claims priority to, and incorporates herein by reference the entire specification of U.S. Provisional Patent application No. 61/584,168 filed Jan. 6, 2012 and titled CAPTURING CONTENT FOR DISPLAY ON A TELEVISION.

This disclosure claims priority to, and incorporates herein by reference the entire specification of U.S. Utility Patent application No. 61/696,711 filed Sep. 4, 2012 and titled SYSTEMS AND METHODS FOR RECOGNIZING CONTENT.

This disclosure claims priority to, and incorporates herein by reference the entire specification of U.S. Utility patent application Ser. No. 13/736,031 filed Jan. 7, 2013 and titled ZERO CONFIGURATION COMMUNICATION BETWEEN A BROWSER AND A NETWORKED MEDIA DEVICE.

FIELD OF TECHNOLOGY

This disclosure relates generally to the technical field of advertising, and in one example embodiment, this disclosure relates to a method, apparatus and/or system related to relevant advertisement generation based on a user operating a client device communicatively coupled with a networked media device.

BACKGROUND

An advertiser may be a single party advertiser, an aggregate of advertisers, and/or an advertisement agency. The advertiser may target advertisements to a user through any number of mediums, such as a television channel, a webpage of a client device, and/or a mobile application. Advertisements for the same or similar products may be more effective when targeted to the user through multiple mediums and within a specific time frame. However, the advertiser may have trouble identifying which televisions and/or client devices are associated with the user at a given time. In addition, the advertiser may be unaware of when an particular advertisement is displayed on a television associated with the user. Therefore, it may be difficult for the advertiser to target an advertisement of the same or similar product to a client device of the user within the specific time frame.

SUMMARY

Disclosed are a method, apparatus and/or system related to delivery of a targeted advertisement to a client device based on relevant advertisement generation based on a user operating a client device communicatively coupled with a networked television.

In one aspect, a method includes determining that a user is likely viewing a television and/or accessing a client device while viewing the television, determining that the content currently being displayed on the television is associated with a motion-video advertisement through an automatic content recognition algorithm applied to the television, selecting an alphanumeric advertisement formatted for a display area of the client device based on contextual match between the motion-video advertisement and/or the alphanumeric advertisement, and delivering the alphanumeric advertisement to the client device while the motion-video advertisement is still rendering on the television.

The method may constrain an executable environment in a security sandbox. The method may execute a sandboxed application in the executable environment. The method may automatically instantiate a connection between the sandboxed application and/or a sandbox reachable service of the networked media device. In addition, the method may determine what content is being shown on the networked media device. The method may select an advertisement to be downloaded on the client device based on a contextual match between the advertisement and/or the content being shown on the networked media device, wherein the alphanumeric advertisement is a textual advertisement, a display advertisement, and/or an audio-visual advertisement.

The method may determine that the user has interacted with the alphanumeric advertisement when the user selects a hyperlink in the alphanumeric advertisement. The method includes displaying the motion-video advertisement on the television based on the determination that the user has interacted with the alphanumeric advertisement by selecting the hyperlink in the alphanumeric advertisement.

In another aspect, a machine-implemented method of targeted advertising to a client device includes automatically inferring a current association and/or a previous association of the client device with a television, automatically identifying a first content displayed on the television, automatically associating a time stamp with the first content, and automatically targeting a second advertisement to the client device based on the first content.

The first content may be a television show. The method includes determining from a schedule that the television show that the user previously watched is airing next. The method may select an alphanumeric advertisement associated with the television show formatted for a display area of the client device based on contextual match between the television show and/or the alphanumeric advertisement. The method may deliver the alphanumeric advertisement to the client device prior to airing of the television show.

The first content may be a first advertisement. The second advertisement may deliver to the client device while the first advertisement is still rendering on the television. The method may automatically catalogue the first advertisement. The inferring and/or the automatically targeting may be through a web browser and/or an application of the client device. The automatically targeting a second advertisement to the client device may be based on the first advertisement is within a predetermined time threshold of the time stamp.

The second advertisement may be interactive. The current association and/or the previous association of the client device with the television may be inferred based on a public IP address range, a public IP address, a base station MAC address, a base station BSSID, a base station SSID, a Bluetooth MAC address, a geolocation, a WiFi direct MAC address of the television, WiFi direct BSSID of the television, a short code, a username, and/or a quick response (QR) code that is shared by and/or visible to both the client device and/or the television.

The current association and/or the previous association of the client device with the television may be inferred based on a mutually visible identifying signal from the television or a device external to the television, independent of whether one or both of the television and/or the client device can connect to the third device other than to receive the identifying signal. The current association and/or the previous association of the client device with the television may be inferred based on whether redirecting a browser of the client device and/or an application of the client device to a private IP address of the television establishes a communication between the client device and/or the television.

The current association and/or the previous association of the client device with the television may be inferred based on whether instructing an application of the client device to perform a multicast and/or a broadcast based discovery establishes a communication between the client device and/or the television. The automatically identifying may be through an automatic content recognition (ACR) of the television.

In yet another aspect, a system of targeted advertising includes a client device associated with one or more servers through a network, a web browser of the client device, and a television associated with the one or more servers through the network. The one or more servers may be configured to automatically infer a current association and/or a previous association of the client device with the television. The method may automatically identify a first advertisement displayed on the television. In addition, the method may automatically catalogue the first advertisement in an advertisement database. In addition, the method may automatically associate a time stamp with the first advertisement.

The method may automatically target a second advertisement to a webpage displayed by the web browser of the client device based on the first advertisement and/or within a predetermined time threshold of the time stamp. The television may include a frame buffer communicatively coupled to a processor. The processor may be configured to generate at least one fingerprint. The at least one fingerprint may include at least one of an image fingerprint, a sequence of image fingerprints, a fingerprint of a sequence of images, and/or an audio fingerprint. The processor may be configured to communicate the at least one fingerprint to the one or more servers. The automatic identification of the first advertisement may be based on an advertisement fingerprint database and/or the at least one fingerprint.

The one or more servers may be configured to receive the at least one fingerprint, automatically identify a channel the television is tuned to based on the at least one fingerprint, and/or generate at least one channel-specific fingerprint. The automatic identification of the first advertisement may be based on an advertisement fingerprint database and/or the at least one channel-specific fingerprint. The second advertisement may be interactive.

The current association and/or the previous association of the client device with the television may be inferred based on a public IP address range, a public IP address, a base station MAC address, a base station BSSID, a base station SSID, a Bluetooth MAC address, a geolocation, a WiFi direct MAC address of the television, WiFi direct BSSID of the television, a short code, a username, and/or a quick response (QR) code that is shared by and/or visible to both the client device and/or the television.

The current association and/or the previous association of the client device with the television may be inferred based on a mutually visible identifying signal from the television or a device external to the television, independent of whether one or both of the television and/or the client device can connect to the third device other than to receive the identifying signal. The current association and/or the previous association of the client device with the television may be inferred based on whether redirecting the browser of the client device to a private IP address of the television establishes a communication between the client device and/or the television.

In yet another aspect system of targeted advertising includes a client device associated with servers through a network, an application of the client device, and a television associated with the one or more servers through the network. The one or more servers may be configured to: automatically infer a current association and/or a previous association of the client device with the television, automatically identify a first advertisement displayed on the television, automatically catalogue the first advertisement in an advertisement database, automatically associate a time stamp with the first advertisement, and automatically target a second advertisement to the application of the client device based on the first advertisement and/or within a predetermined time threshold of the time stamp.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF DRAWINGS

Example embodiments are illustrated by way of example and not limitation in the Figure of the accompanying drawing, in which like references indicate similar elements and in which:

FIGS. 7A-B are block diagrams of a system of targeted advertising to a client device, through an ad exchange, based on an advertisement displayed on a television, according to one embodiment.

Figure 1:
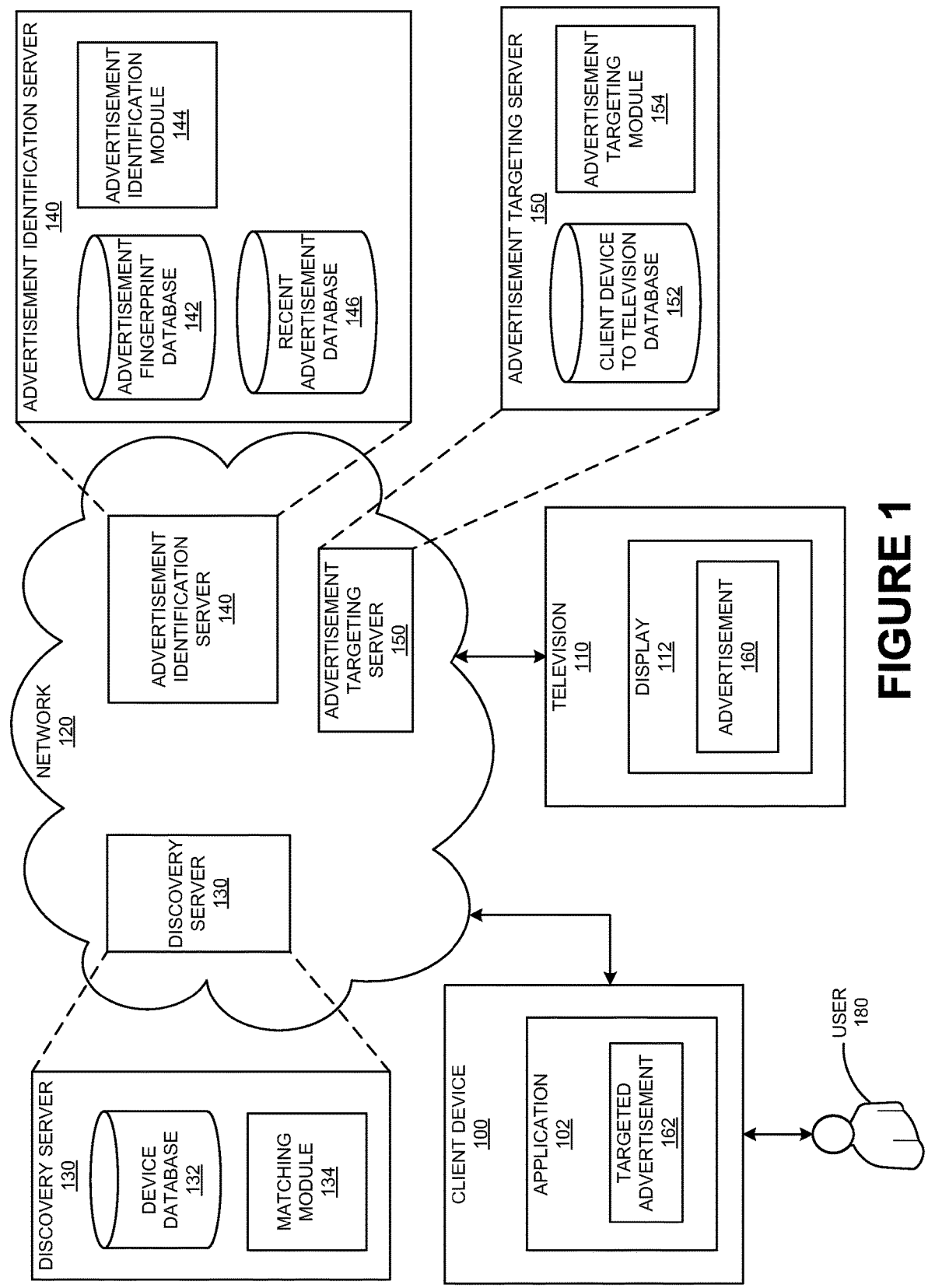
FIG. 1 is a block diagram of a system of targeted advertising to a client device, through an application, based on an advertisement displayed on a television, according to one embodiment.

Other features of the present embodiments will be apparent from the accompanying drawings and from the detailed description that follows.

DETAILED DESCRIPTION

A method, apparatus and/or system related to delivery of a targeted advertisement to a client device based on relevant advertisement generation based on a user operating a client device communicatively coupled with a networked television.

In one embodiment, a method includes determining that a user 180 is likely viewing a television 110 and/or accessing a client device while viewing the television 110, determining that the content currently being displayed on the television 110 is associated with a motion-video advertisement (e.g., the advertisement 160 in an embodiment of a television commercial) through an automatic content recognition algorithm applied to the television 110, selecting an alphanumeric advertisement formatted for a display area of the client device based on contextual match between the motion-video advertisement (e.g., the advertisement 160) and/or the alphanumeric advertisement (e.g., a text and/or image advertisement), and delivering the alphanumeric advertisement to the client device while the motion-video advertisement (e.g., the advertisement 160) is still rendering on the television 110.

The method may constrain an executable environment in a security sandbox (e.g, in a web browser). The method may execute a sandboxed application in the executable environment. The method may automatically instantiate a connection between the sandboxed application and/or a sandbox reachable service of the networked media device. In addition, the method may determine what content is being shown on the networked media device. The method may select an advertisement to be downloaded on the client device based on a contextual match between the advertisement and/or the content being shown on the networked media device, wherein the alphanumeric advertisement is a textual advertisement, a display advertisement, and/or an audio-visual advertisement.

The method may determine that the user 180 has interacted with the alphanumeric advertisement when the user 180 selects a hyperlink in the alphanumeric advertisement. The method includes displaying the motion-video advertisement (e.g., the advertisement 160) on the television 110 based on the determination that the user 180 has interacted with the alphanumeric advertisement by selecting the hyperlink in the alphanumeric advertisement.

A user may use a client device and watch a television at the same time. The client device may be a laptop, tablet, mobile phone, or any other portable electronic device. The television may be tuned to a terrestrial broadcast, a satellite channel, or a cable channel. The television may stream content over a television network (e.g. a terrestrial broadcast network, a satellite network, or a cable television network) or an internet protocol (IP) network. In one example, the television may receive a video stream from an internet service (e.g. Hulu, Crunchyroll, etc.) over the IP network. The television may display a first advertisement. An association of the client device and the television with each other and/or with the user may be inferred by a number of methods, as disclosed in a number of embodiments and Figures herein. An advertiser (e.g. a single-party advertiser, an aggregate of advertisers, and/or an advertisement agency) may desire to target a second advertisement to the client device based on the first advertisement and/or the inferred association.

In one or more embodiments, the client device and the television may both be inferred to be associated with each other and/or with the user. The association may be inferred based on a geospatial proximity, a shared public IP address, a shared public IP address range, a base station MAC address, a base station service set identifier (base station BSSID), a direct pairing, and/or a shared identifier. Geospatial proximity may be inferred by GPS. Alternatively or in addition, geospatial proximity may be inferred by mutual visibility of a base station BSSID and/or base station MAC address (even if the client device 100 and/or the television 110 cannot connect or communicate through the base station). The shared identifier may be a globally unique identifier (GUID), a session ID, a username and/or password, an ephemeral GUID, a short code, a quick response code (QR code) or any combination thereof. In addition or alternatively, the association may be inferred based on a discovery protocol, such as a redirect (e.g. a redirect of a browser or application that specifies a private IP of a television that may be associated with the client device), a multicast protocol (e.g. a simple service discovery protocol (SSDP)), and/or a broadcast protocol. Other discovery protocols are within the scope of the embodiments disclosed herein. The discovery protocol may establish whether the client device and television are currently connected to the same network (e.g. through a private network, via LAN, and/or by direct pairing) or whether the client device can view a network the television is connected to. In one or more embodiments, the association may be inferred based, at least in part, on a previously inferred association. For example, if at one time, an association of a client device at an original geolocation and a television with a user is inferred based on a shared user ID of the client device and the television, the association may later be inferred simply by geospatial proximity of the client device to the original geolocation.

In one or more embodiments, the television may display the first advertisement. The first advertisement may be identified by automatic content recognition (ACR) and/or an advertisement identification module run on the television and/or run on a server of a network the television is connected to. Alternatively, the ACR may be an audio ACR run on a client device within hearing range of a television. This would be useful for identifying an advertisement played on a television without an ACR. The identified first advertisement may be catalogued on the server, or on another server. Further, the identified first advertisement may be associated with a time stamp.

In one or more embodiments, the second advertisement may be targeted to the client device based on the identified first advertisement. The second advertisement may be targeted within a time threshold of the time stamp. The second advertisement may share a brand, service, product, and/or product line with the identified first advertisement. In one or more embodiments, the second advertisement may be interactive (e.g. may allow the user to navigate to a website, participate in a survey, claim a coupon or incentive, etc.).

In one or more embodiments, the ACR module may be used to identify other content besides or in addition to advertisements, such as objects, people, and/or locations featured on a channel the television is tuned to. The second advertisement may be determined, at least in part, based on the other content. For example, a television may display a car show. The second advertisement may be an advertisement for a car model and/or brand.

The inferred association between the client device and the television, the identification, cataloging and time stamping of the first, and the targeting of the second advertisement to the client device may be performed by one or more servers connected to the client device and/or television across a network. A number of servers, with various databases and modules, are illustrated in the Figures. The servers are organized by function, although one or more of the servers may be part of the same server. Further, different organization of the databases and modules between servers are within the scope of the embodiments disclosed herein.

Reference is now made to FIG. 1, which is a block diagram of a system of targeted advertising to a client device 100, through an application 102, based on an advertisement 160 displayed on a television 110. The client device 100 may be a laptop, tablet, mobile phone, or any other portable electronic device. The client device 100 may comprise an application 102. The application 102 may or may not be sandboxed. The television 110 may comprise a display 112. The advertisement 160 displayed by the television 110 may be a video advertisement, an overlay advertisement, and/or a placement advertisement. The client device 100 and the television 110 may be coupled to a network 120, such as a wide area network (WAN) and/or an IP network. The television 110 may, over a television network (e.g. the network 120 or another network such as an IP network or a television network), stream content that contains advertisements. The network 120 may comprise one or more servers involved in targeted advertising to the client device 100 based on the advertisement 160 displayed on the television 110.

In one or more embodiments, the network 120 may comprise a discovery server 130. The discovery server 130 may comprise a device database 132 that stores device-identification data (i.e. data useful for identifying the client device 100 and/or the television 110). The device-identification data may be a current or previous geospatial proximity, a public IP address, a public IP address range, a service set identifier (SSID), a base station MAC address, a base station service set identifier (base station BSSID), a direct pairing, a globally unique identifier (GUID), a session ID, a username and/or password, an ephemeral GUID, a short code, a quick response code (QR code) or any combination thereof. A matching module 134 of the discovery server 130 may infer an association between the client device 100 and the television 110 based on a shared device-identification data. The inferred association between the client device 100 and the television 110 may be an inferred connectivity of the client device 100 to the television 110 and/or an inferred association of both the client device 100 and the television 110 with a user 180. In one or more embodiments, the application 102 may communicate device-identification data to the discovery server 130 to be stored in the device database 132.

In one example, the user 180 may input a username and/or short code to both the client device 100 and the television 110 (e.g. at the same time or at different times). The username and/or short code associated with the client device 100 and the username and/or short code associated with the television 110 may be stored on the device database 132. The matching module 134 may infer an association between the client device 100 and the television 110 based on the username and/or short code shared by the client device 100 and the television 110.

In another example, a short code may be displayed on the television 110 based on an inferred proximity of the client device 100 to the television 110. The client device 100 may prompt the user 180 to input and/or confirm the short code displayed on the television 110. An association between the client device 100 and the television 110 may then be inferred by the matching module 134, based on the user 180 input and/or confirmation of the short code presented on the television 110.

In another example, when the user 180 uses the application 102 to take a picture of a QR code displayed on the television 110, the application 102 may communicate the QR code to the discovery server 130. The matching module 134 may infer an association between the client device 100 and the television 110 based on the QR code shared by the client device 100 and the television 110. Examples of using other device-identification data and/or combinations of device-identification data to infer an association between the client device 100 and the television 110 are within the scope of the embodiments disclosed herein.

In one or more embodiments, the network 120 may further comprise an advertisement identification server 140. The advertisement identification server 140 may identify an advertisement 160 displayed on the television 110. The advertisement identification server 140 may comprise an advertisement fingerprint database 142. The advertisement fingerprint database 142 may store fingerprints (e.g. image fingerprints, audio fingerprints, video fingerprints and/or a series of fingerprints thereof) associated with one or more advertisements. The television 110 may communicate fingerprints of the advertisement 160 to the advertisement identification server 140. An advertisement identification module 144 may identify the advertisement 160 based on a matching of the fingerprints of the advertisement 160 to fingerprints within the advertisement fingerprint database 142. Further, the advertisement identification module may also account for noise, changes to aspect ratio, and/or other transformations that may complicate the identification of the advertisement 160. The advertisement identification module 144 may catalogue (i.e. store information relating to) the advertisement 160 in a recent advertisement database 146. The advertisement identification module 144 may further associate a time stamp with the advertisement 160.

In one or more embodiments, the fingerprints stored in the advertisement fingerprint database 142 may be provided by one or more advertisers. Alternatively or in addition, the fingerprints stored in the advertisement fingerprint database 142 may be provided by an algorithm that infers an advertisement based on the fingerprints provided by the television 110. For example, a sequence of image fingerprints may be inferred to be an advertisement based on repetition.

In one or more embodiments, the network 120 may further comprise an advertisement targeting server 150. The advertisement targeting server 150 may comprise a client device to television database 152. The client device to television database 152 may comprise inferred associations between client devices and televisions (e.g. inferred direct coupling, inferred connectivity through a network, and/or inferred association with the same user). In one embodiment, the client device to television database 152 may be generated by the matching module 134. The advertisement targeting server 150 may further comprise an advertisement targeting module 154. The advertisement targeting module 154 may access the client device to television database 152 and/or the recent advertisement database 146. The advertisement targeting module 154 may target an advertisement 162 to the client device 100 based on an identified advertisement (e.g. the advertisement 160) displayed on a television (e.g. the television 110) inferred to be associated with the client device. The advertisement targeting module 154 may target the advertisement 162, through the application 102, to the client device 100.

In one or more embodiments, the advertisement 162 may feature a same or similar product, product line, and/or brand as featured by the advertisement 160. The advertisement 162 may be a video advertisement, audio advertisement, overlay advertisement, image advertisement, banner advertisement, placement advertisement, interactive advertisement and/or a continuation advertisement (e.g. an advertisement that refers to content in the advertisement 160).

Alternatively or in addition, the advertisement 162 may be a competitor advertisement and/or a rebuttal advertisement. In one example of a competitor advertisement, the advertisement 160 may be for a car model of one brand and the advertisement 162 may be for a car model of a competing brand. In one example of a rebuttal advertisement, the advertisement 160 may make a claim of superiority over another brand and the advertisement 162 may respond to the claim of superiority. In one or more embodiments, the determination of advertisement 162 may be offered to the advertiser behind the advertisement 160, before being offered to a competitor of the advertiser.

In one or more embodiments, the application 102 may be configured by a software development kit (SDK) to receive and display the advertisement 162 from the advertisement targeting module 154. In one or more embodiments, the advertisement targeting module 154 may target the advertisement 162 to the client device within a time threshold of the time stamp.

In one example, an inferred association between the client device 100 and the television 110 may be stored in the client device to television database 152. The advertisement 160 may be identified, catalogued in the recent advertisement database 146, and/or time stamped by the advertisement identification module 144. The advertisement targeting module 154 may target the advertisement 162, based on the client device to television database 152 (i.e. inferred association between the client device 100 and the television 110) and the recent advertisement database 146 (i.e. the identified advertisement 160), to the client device 100 through the application 102.

In one or more embodiments, the advertisement 162 may be interactive (e.g. allow the user to respond to a survey, navigate the user to the advertiser's website, etc.). For example, the advertisement 162 may prompt the user 180 to share whether he or she recognizes the product, product line, and/or brand featured in the advertisement 160. A survey of brand recognition may serve as a measure of the success of the advertisement 160.

Figure 2:
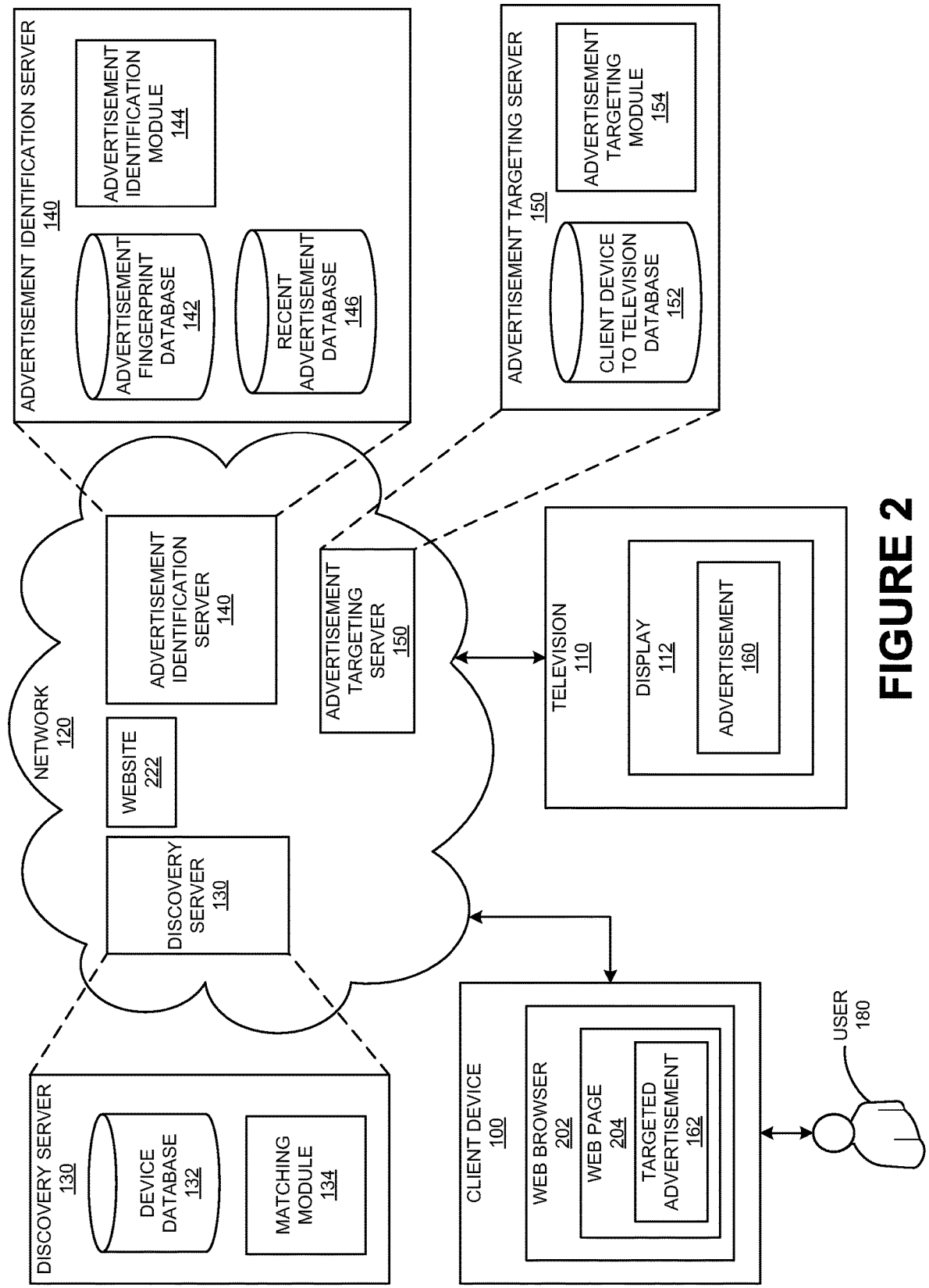
FIG. 2 is a block diagram of a system of targeted advertising to a client device, through a web browser, based on an advertisement displayed on a television, according to one embodiment.

Reference is now made to FIG. 2, which is a block diagram of a system of targeted advertising to the client device 100, through a web browser 202, based on the advertisement 160 displayed on the television 110. The web browser 202 may be directed to a website 222 on the network 120 and may display a web page 204 on the client device 100. In one or more embodiments, the website 222 may communicate, or may direct the web browser 202 to communicate, device-identification data to the discovery server 130 to be stored in the device database 132.

In one or more embodiments, The advertisement targeting module 154 may target the advertisement 162 to the web page 204. In one or more embodiments, the website 222 may be configured by a software development kit (SDK) to receive the targeted advertisement 162 from the advertisement targeting module 154 and/or display the targeted advertisement 162 on the web page 204. The advertisement targeting module may target the advertisement 162, based on the client device to television database (i.e. inferred association between the client device 100 and the television 110) and the recent advertisement database 146 (i.e. the identified advertisement 160).

Figure 3:
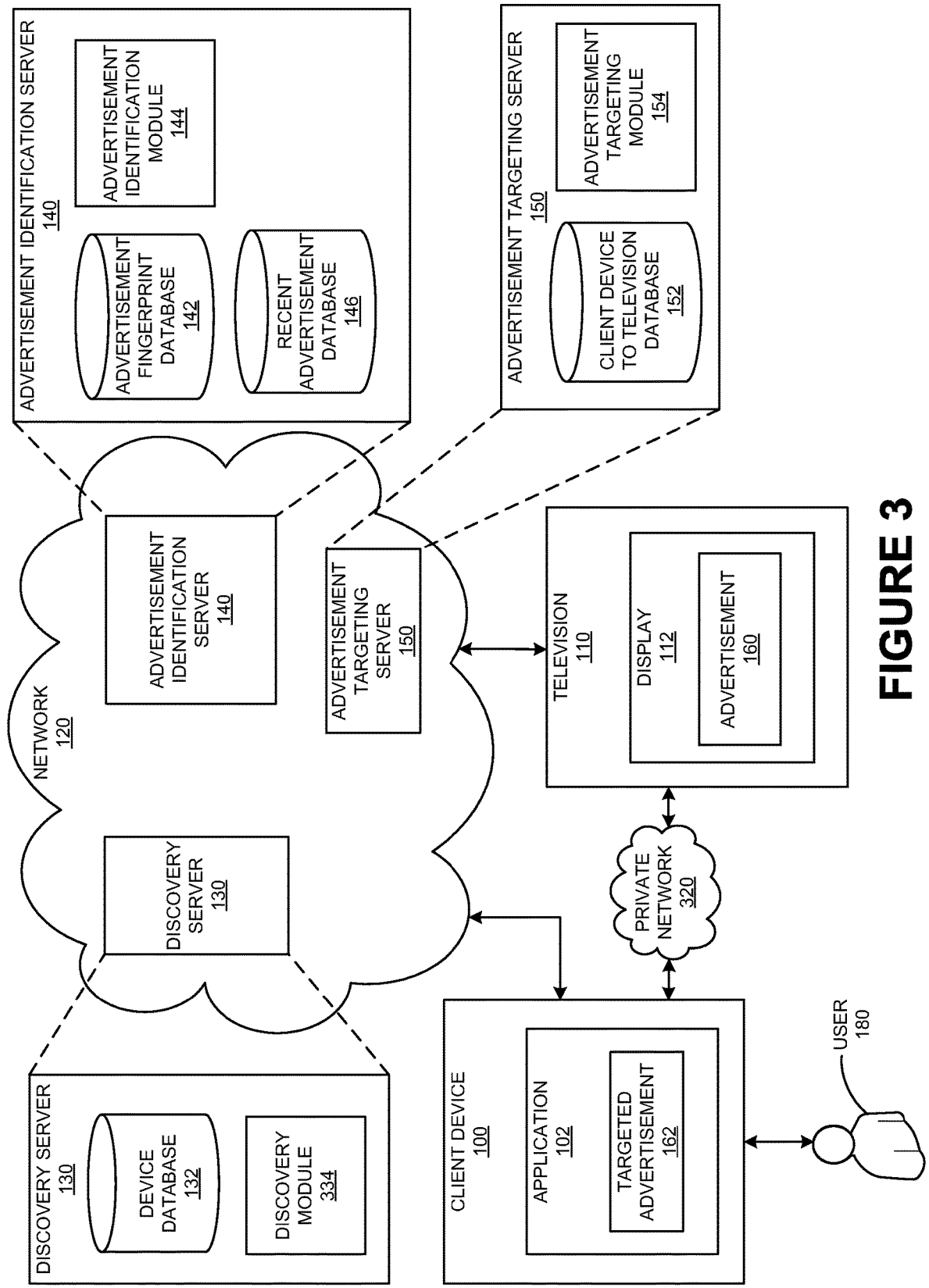
FIG. 3 is a block diagram of a system of discovery, through an application, of a television networked to a client device and targeted advertising to the client device, according to one embodiment.

Reference is now made to FIG. 3, which is a block diagram illustrating a system of discovery, through the application 102 of a client device 100, of the television 110 connected to a private network 320. The private network 320 may be one or more LANs and/or wireless LANs (WLANs), and may span a single room or multiple buildings in proximity. The client device 100 and/or television 110 may be coupled to the private network 320, capable of connecting to the private network 320, and/or capable of viewing a wireless base station of the private network 320, any of which may allow an inferred association between the client device 100 and the television 110.

In one or more embodiments, the discovery server 130 of the network 120 may comprise a discovery module 334. The discovery module 334 may access information about one or more devices (e.g. the client device 100 and/or the television 110) from the device database 132. In one or more embodiments, the discovery module 334 and/or the application 102 may instruct the client device 100 (e.g. through the application 102) to attempt to establish a communication with the television 110 through the private network 320. The television 110 may provide an advertisement identification service (e.g. an ACR). The discovery module 334 and/or the application 102 may instruct the client device 100 to perform a broadcast and/or multicast (e.g. a user datagram protocol (UDP) or a pragmatic general multicast (PGM)) based discovery to establish the communication. The application 102 may report whether the communication was established to the discovery module 334.

In one or more embodiments, the application 102 may employ the broadcast or the multicast based discovery independent of any previously inferred association between the client device 100 and the television 110. For example, the application 102 may automatically employ the broadcast or the multicast based discovery every time the application 102 is run on the client device 100.

In one or more embodiments the client device 100 may be configured to view an identifying signal from a base station (e.g. an airport base station, a base station MAC address, a base station BSSID, etc.), television (e.g. WiFi direct MAC address), and/or an SSID. In one or more embodiments, the client device 100 may report a viewed base station (e.g. e.g. one or more of the viewed base station's MAC address, BSSID, etc.) and/or a viewed television 110 (e.g. one or more of WiFi Direct MAC address, BSSID and SSID or the television's 110 Bluetooth MAC address of the television 110) to the device database 132.

In one or more embodiments, the discovery module 334 may match the client device 100 to the television 110 based on the viewed base station's MAC address, BSSID and/or SSID, or based on a WiFi Direct MAC address, BSSID, and/or SSID. In one or more embodiments the client device 100 may be configured to automatically search for viewable base stations and/or SSID addresses.

In one or more embodiments, the client device 100 and the television 110 may report to the device database 132 any visible wirelessly broadcast identifier that may then be used as a landmark regardless of whether the signal emits from a base station, the television 110, or any other device. The discovery module 334 may match the client device 100 to the television 110 based on the landmark visible to both the client device and the television 110, even if the client device 100 and/or television 110 cannot otherwise connect to and/or communicate with the landmark.

Figure 4:
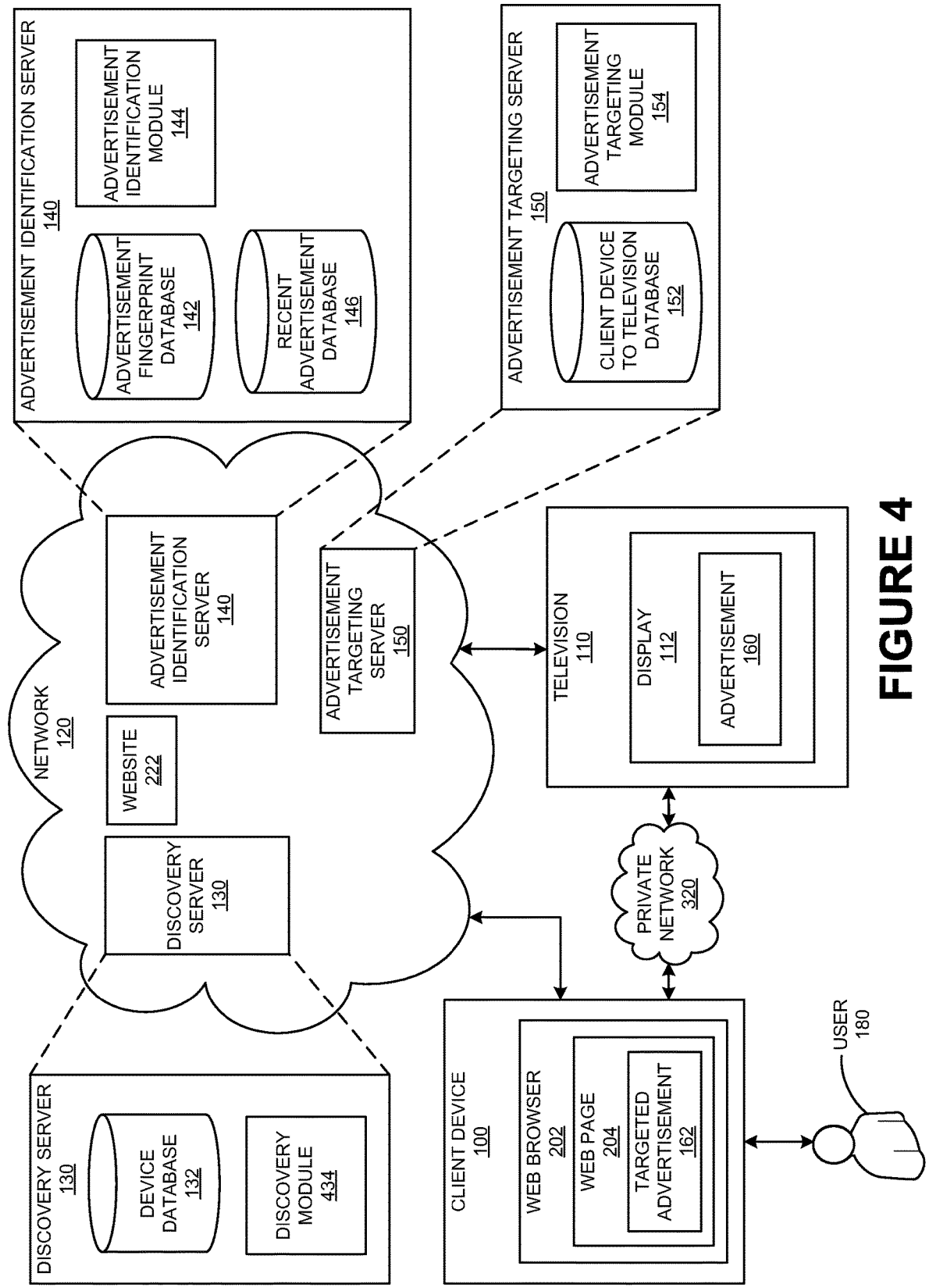
FIG. 4 is a block diagram of a system of discovery, through a web browser, of a television networked to a client device and targeted advertising to the client device, according to one embodiment.

Reference is now made to FIG. 4, which is a block diagram illustrating a system of discovery, through the web browser 202 of the client device 100, of the television 110 connected to a private network 320. The private network 320 may be one or more LANs, and may span a single room or multiple buildings in proximity. The client device 100 may be coupled to the private network 320, capable of connecting to the private network 320, and/or capable of viewing a wireless base station of the private network 320, any of which may allow an inferred association between the client device 100 and the television 110.

In one or more embodiments the television 110 may have a private IP address. Further, the private IP address of the television 110 may be stored as device identification data in the device database 132 of the discovery server 130. In one or more embodiments, the discovery module 434 may infer the possibility that the client device 100 is in proximity and/or has access to the television 110 based on one or more device-identification data. Examples of device-identification data are provided in the discussion of FIG. 1.

In one or more embodiments, the website 222 may redirect the web browser 202 to the private IP address of the television 110. The television may report the redirect to the discovery module 434 (thus confirming an association between the client device 100 and the television 110) and/or may store a record of the association between the client device 100 and the television 110 in the client device to television database 152. Alternatively, the television 110 my redirect the web browser 202 to the discovery server 130 and/or the discovery module 434 of the discovery server 130. In one or more embodiments, the television 110 may redirect the web browser to the discovery module 434.

In one or more embodiments, the website 222 and/or additional websites may redirect the web browser to other private IP addresses, thus employing a trial and error method of discovery.

In one or more embodiments an image tag dropped on the website may redirect the web browser to the private IP address of the television 110. In one or more embodiments, the website 222 may sync a cookie with an ID (e.g. Google ID (GID), GUID, etc.). The synced cookie and ID may be present in the HTTP address of a redirect. Upon redirection of the browser to the television 110 based on the private IP address, the television may report the cookie and ID to the discovery module 434 and/or may store a record of the association between the client device 100 and the television 110 in the client device to television database 152.

Figure 5:
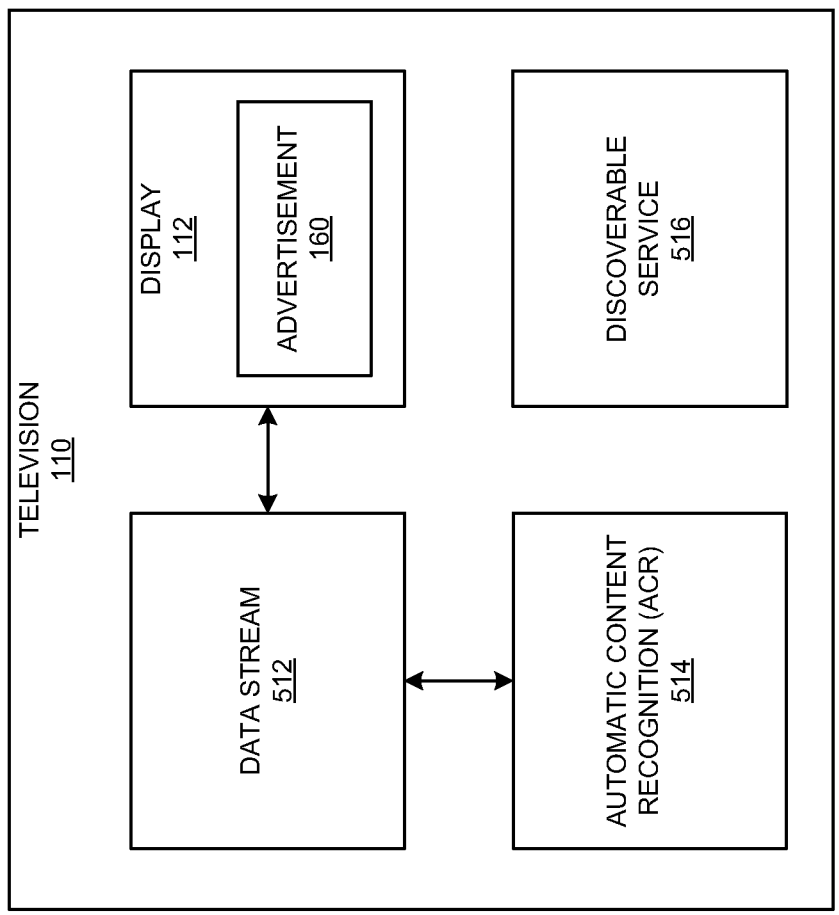
FIG. 5 is an exploded view of the television of FIG. 1, according to one embodiment.

Reference is now made to FIG. 5, which is an exploded view of the television 110 of FIG. 1. The television 110 may receive a data stream 512 from a television network (e.g. a terrestrial broadcast network, a satellite network, or a cable television network) or an internet protocol (IP) network. The data stream 512 may be audio and/or video data. Video data may be rendered on the display 112 of the television 110. The television 110 may render an advertisement 160, sent over the data stream 512, on the display 112.

In one or more embodiments, the television may comprise an automatic content recognition (ACR) 514. The ACR 514 may have access to the data stream 512. For example, the ACR 514 may access video data through a frame buffer of the television 110. The ACR 514 may extract one or more fingerprints (e.g. image fingerprints, audio fingerprints, video fingerprints and/or a series of fingerprints thereof) from the data stream 512.

In one example, a video fingerprint may be a fingerprint of a series of images. The video fingerprint may comprise motion vectors and/or other features that deal with the differences between frames or a sequence of frames.

In one or more embodiments, the ACR 514 may send the fingerprints to the advertisement identification module 144 of FIG. 1. The ACR 514 and/or the advertisement identification module 144 may account for noise, changes to aspect ratio, and other transformations that may complicate the identification of the advertisement 160.

In one or more embodiments, the advertisement identification module 144 may identify the advertisement 160 displayed by the television 110 by comparing the fingerprints to the advertisement fingerprint database 142. The advertisement identification module 144 may further catalogue (i.e. store information relating to) the advertisement 160 in the recent advertisement database 146. In one embodiment, the fingerprints may be a series of image fingerprints. In one or more embodiments, new fingerprints may be extracted (e.g. at the advertisement identification server 140) from whole image data, video, audio, and/or fingerprints generated by the ACR 514. The new fingerprints may then be communicated to the advertisement identification module 144.

In one or more embodiments, the television 110 may further comprise a discoverable service 516. The discoverable service 516 may enable the application 102 of FIG. 3 and/or the web page 204 of FIG. 4 to discover the television 110. The application 102 and/or the web page 204 may or may not be sandboxed. In another embodiment, the discoverable service 516 may report to the device database 132 of FIG. 1 any visible wirelessly broadcast identifier that may then be used as a landmark regardless of whether the signal emits from a base station, the television 110, or any other device. Alternatively or in addition, the discoverable service 516 may report a viewed base station (e.g. one or more of the viewed base station's MAC address, BSSID, etc.) and/or a viewed television 110 (e.g. one or more of WiFi Direct MAC address, BSSID and SSID or the television's 110 Bluetooth MAC address of the television 110) to the device database 132.

Figure 6A:
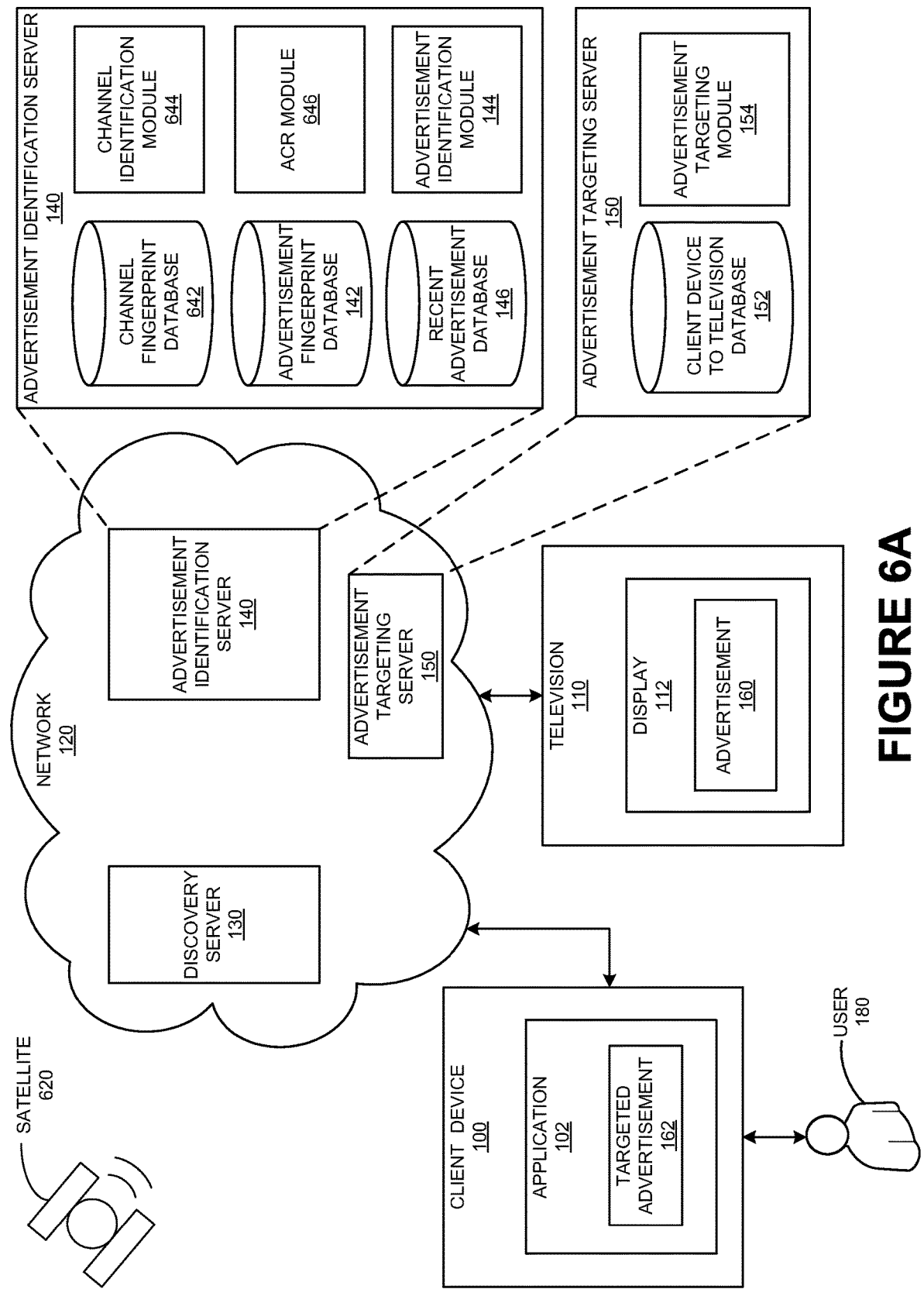
FIG. 6A-B are block diagrams of a system of targeted advertising to a client device based on an advertisement displayed on a television, wherein the advertisement is identified based on a channel the television is tuned to, according to one embodiment.
Figure 6B:
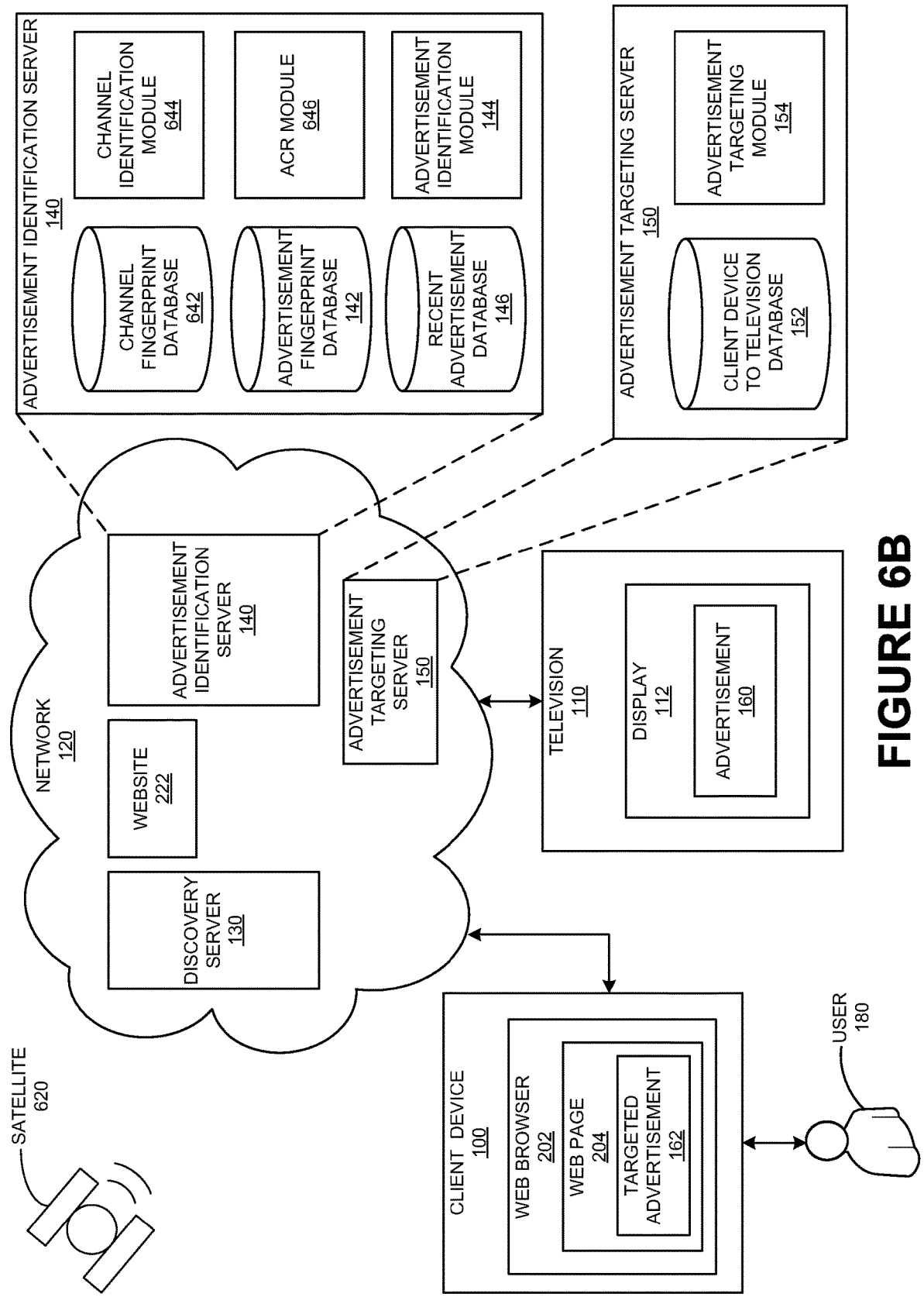

Reference is now made to FIGS. 6A-B, which is a block diagram of a system of targeted advertising to the client device 100 based on the advertisement 160 displayed on the television 110, wherein the advertisement 160 is identified based on a channel the television 110 is tuned to. The advertisement identification server 140 may be located within a studio or household receiving one or more channels, within a cable television head end, in a satellite uplink, or in a market where the content is distributed earlier. The advertisement identification server 140 may identify a channel based on one or more fingerprints from the television 110, and may run a separate ACR to generate detailed fingerprints at the location of the advertisement identification server 140. This system allows for more intense processing to be performed at the location of the advertisement identification server 140, which may have access to greater computing power than by the television 110. Further, this system circumvents issues that arise if the ACR (e.g. a third party ACR) run on the television 110 does not provide fingerprints suitable for advertisement identification.

In one or more embodiments, the advertisement identification server 140 may comprise a channel fingerprint database 642 and a channel identification module 644. The channel identification module 644 may receive, directly or indirectly, fingerprints from the television 110. The channel identification module may identify a channel the television 110 is tuned to by comparing the fingerprints to the channel fingerprint database 642. An ACR module 646 of the advertisement identification server 140 may generate detailed fingerprints from the identified channel (e.g. from a video feed, a frame buffer, or another source of channel-specific video data). The advertisement identification module 144 may identify the advertisement 160 being displayed on the television 110 based on a comparison of the detailed fingerprints generated to the advertisement fingerprint database 142. The advertisement identification module 144 may catalogue (i.e. store information relating to) the identified advertisement 160 in the recent advertisement database 146.

In one or more embodiments, the channel identification module 644 may infer the channel being rendered by the television 110 by comparing fingerprints from the television 110 with fingerprints received from an authoritative source such as a dedicated capture infrastructure. The dedicated capture may comprise a capture device receiving video from a cable, satellite 620, terrestrial broadcast, or streaming channel. If fingerprints from the television 110 sufficiently match to fingerprints from the dedicated capture infrastructure then the channel is identified (meaning the television 110 is inferred to be rendering the identified channel).

In one or more embodiments, the advertisement targeting module 154 may access the client device to television database 152 and/or the recent advertisement database 146. The advertisement targeting module 154 may target an advertisement 162 to the client device 100 based on an identified advertisement displayed on a television inferred to be associated with the client device. The advertisement targeting module 154 may target the advertisement 162 through the application 102 to the client device 100, as shown in FIG. 6A. Further embodiments involving targeted advertising through the application 102 have been discussed in FIG. 1, and are within the scope of the embodiments disclosed herein. Alternatively, the advertisement targeting module 154 may target the advertisement 162 through the website 222 and/or web browser 202 to the client device 100, as shown in FIG. 6B. Further embodiments involving targeted advertising through the website 222 and/or web browser 202 have been discussed in FIG. 2, and are within the scope of the embodiments disclosed herein.

In one or more embodiments, the advertisement identification server 140 may be placed (e.g. within a studio or household receiving one or more channels, within a cable television head end, in a satellite uplink, or in a market where the content is distributed earlier) to receive one or more fingerprints from an advertisement 160 before the television displays the advertisement 160. The advertisement identification server 140 and may therefore be capable of identifying the advertisement before it is displayed on the television 110. The advertisement targeting server 150 may target the advertisement 162 to the client device 100 before the advertisement 160 is displayed on the television 110. In one or more embodiments, the advertisement 162 may be a continuation advertisement (e.g. may refer to or lead into content of the advertisement 160 at the time or before the advertisement 160 is displayed).

Figure 7B:
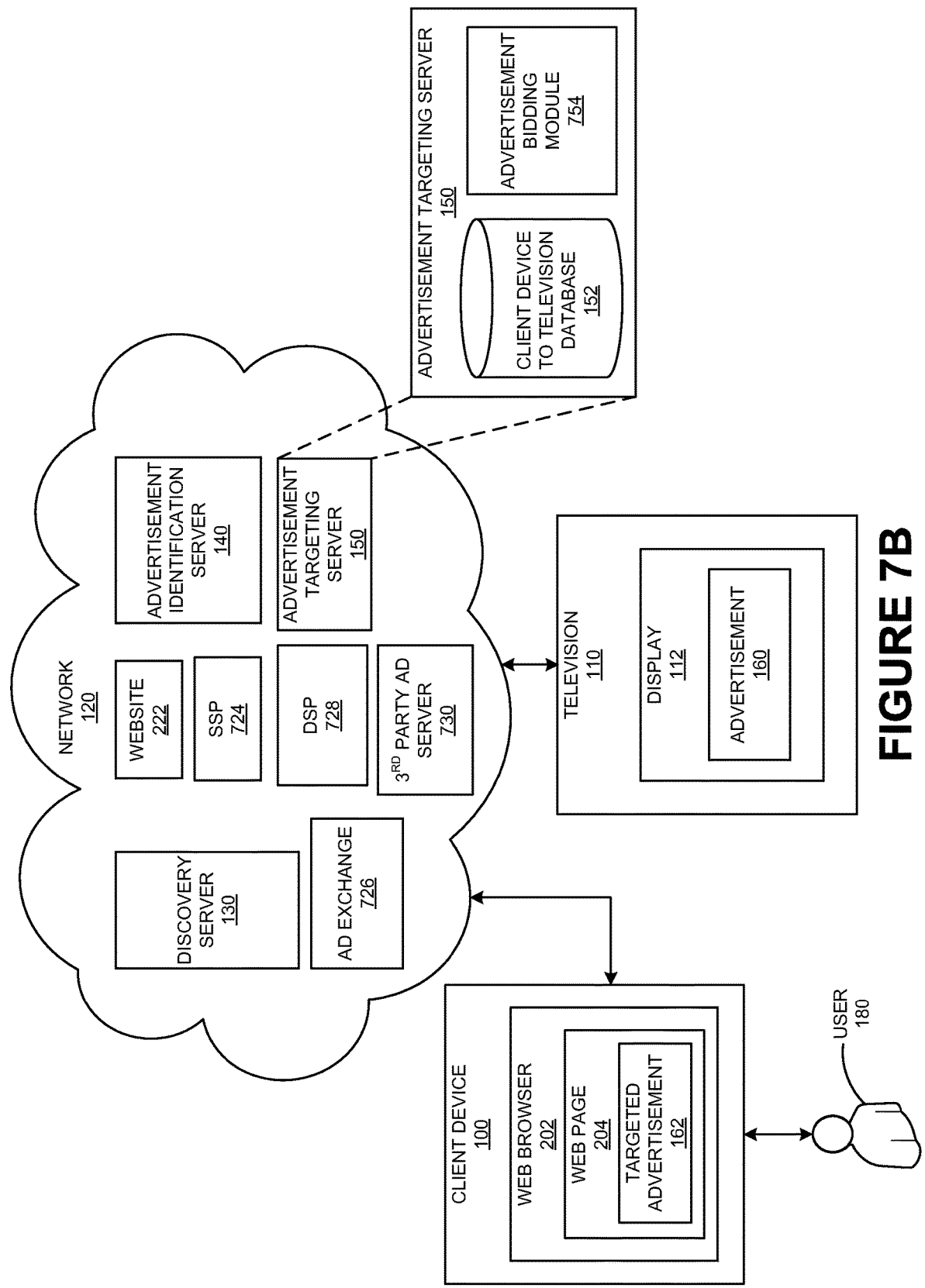

Reference is now made to FIGS. 7A-B, which is a block diagram of a system of targeted advertising to a client device 100, through an ad exchange 726 and an application 102, based on an advertisement 160 displayed on a television 110. The ad exchange 726 may allow for advertisements to be targeted to a wider range of client devices. Further, the prices set by the ad exchange 726 may not take into account the identified advertisement 160 and/or an inferred association between the client device 100 and the television 110. An arbitrage may be possible when an advertiser, if given the additional information of the identified advertisement 160 and/or the inferred association between the client device 100 and the television 110, would be willing to bid (e.g. pay, buy) for an advertisement spot at a higher price than the advertising spot is being sold for.

In one or more embodiments, the ad exchange 726 may be coupled to a supply side platform (SSP) 724 that aggregates one or more applications, configured for advertisement placement, across a number of client devices. The ad exchange 726 may be coupled to a demand side platform (DSP) 728 that aggregates one or more advertisers (e.g. single party advertisers, ad agencies, etc.). The ad exchange 726 may open, to the DSP 728, a bid request for an advertisement spot. A $3^{rd}$ party server 730 may target an advertisement to the advertisement spot based on a bid (e.g. sale) on the advertisement spot.

In one or more embodiments, an advertisement bidding module 754 of the advertisement targeting server 150 may bid in real time, through the ad exchange 726, to place an advertisement 162 on the client device 100. The advertisement bidding module 754 may bid based on an identification of the advertisement 160 of the television 110 and an inferred association of the client device 100 and the television 110. Further, the advertisement bidding module 754 may bid based on a price the advertiser of the advertisement 162 is willing to pay for placement of the advertisement 162 on the client device.

Further, the ad exchange 726 may sell the advertisement spot with the associated content ID on the ad exchange 726 for a higher price than the original advertisement spot. The content ID may identify the inferred association between the client device 100 and the television 110 and/or the advertisement 160 displayed by the television 110). An advertiser may be interested to bid on the advertisement spot when it is associated with the content ID. The advertisement bidding module 754 may be configured to wait to bid on the original advertisement spot until a buyer bids on the advertisement spot associated with the content ID. If a penalty is given for unsatisfied sales, the advertisement bidding module may be further configured to open a bid on the advertisement spot associated with the content ID based on the penalty and a risk that the penalty would be incurred.

In one or more embodiments, the SSP 724 and/or ad exchange 726 may obtain at least one of a content ID (e.g. one or more identifiers of the advertisement 160 and/or other content displayed by the television 110) and associate at least one of the content ID with an advertisement spot. In one or more embodiments, the content ID may be a brand, product, product line, or advertiser of the advertisement 160. Alternatively or in addition, the content ID may be an object, person, and/or location featured on a channel the television is tuned to.

In one or more embodiments, the advertisement bidding module 754 may be configured to bid under certain conditions (e.g. degree of certainty of an association between the client device 100 and the television 110, degree of certainty that the advertisement 160 was correctly identified, price of targeting the advertisement 162 as determined by the ad exchange 762, etc.) predetermined by the advertiser of the advertisement 162. Further, the advertisement bidding module 754 may be configured to bid when the advertiser is willing to pay more (e.g. based on the advertisement 160 and/or the inferred association between the client device 100 and the television 110) than a current bidding price to place the advertisement 162.

In FIG. 7A, the advertisement spot may be available on and/or through an application 102 of the client device 100.

In FIG. 7B, the advertisement spot may be available on and/or through a website 222. In one embodiment, the website 222 serves a web page that includes a URL in an HTML tag (e.g., an IMG, IFRAME, or FRAME tag) that causes the web browser 202 to send a request to the ad exchange 726 or the SSP 724. Because such tags on web page 204 are usually invisible to the user 180, they are called "tracking pixels."

For example, the web page 204 from website 222 may contain the following tracking pixel HTML tag:

<IFRAME SRC="http://example.adex.com/pixel"/>

The iframe tag above may cause the web browser 202 to download a web page from the ad exchange 726 containing one or more HTML tags that cause the web browser 202 to send a request to an advertisement targeting server 150. For example, the request may be:

<IMG SRC="http://example.adex.com/pixel?buyer= advertisementtargetingserver150" width=1 height=1/>

Alternatively, website 222 may directly contain the above IMG tag without first loading an iframe or frame from the ad exchange 726 or the SSP 724. The IMG tag above may cause the web browser 202 to send a request to the ad exchange 726 or a SSP 724. For example, the request may be:

GET/pixel?buyer=advertisementtargetingserver150 HTTP/1.1
Host: example.adex.com
Cookie: user=user180 where user180 represents a user ID for user 180, and advertisementtargetserver150 may be mapped by the advertisement targeting server 150 to the ad exchange 726. For the purposes of illustration, the advertisement targeting server may have previously provided to the ad exchange 726 or SSP 724 the following URL:

http://example.adtargetingserver150.com/pixel

The ad exchange 726 or the SSP 724 maps the advertisementtargetingserver150 id on to the URL provided above and then the ad exchange 726 or the SSP 724 appends a user identifier for user 180 that is mapped from, derived from, or equal to the user ID communicated in the cookie user=user180. For example, the URL may be:

http://example.advertisementtargetingserver150.com/ pixel?user=user180

The ad exchange 726 or the SSP 724 returns to the web browser 202 a redirect (e.g., an HTTP 302) specifying the URL above as the location of the redirect. The web browser 202 then sends a request to the advertisement targeting server 150. For example, the request may be:

GET/pixel?user=user180
Host: example.adex.com

When the request arrives at the advertisement targeting server 150, the advertisement targeting server 150 need only look at the IP packet headers of the request to determine the public IP address of the web browser 202. Thus the advertisement targeting server 150 now has two pieces of information: the public IP address of the web browser 202 and the user ID (e.g. of user 180) of the ad exchange 726 associated with the web browser 202.

The advertisement targeting server 150 then queries the device database 132 for any televisions behind or associated with the public IP or the address range containing the public IP. If any exist (e.g. television 110), the advertisement targeting server 150 may update the client device to television database 152 to reflect the association between the client device 100 and the television 110. Furthermore the advertisement targeting server 150 associates with the client device the ad exchange's user ID user. The advertisement targeting server 150 may then tell the advertisement bidding module 754 to begin placing bids on bid requests from the ad exchange 176 for user 180, based on any recent advertisement 160 displayed on television 110, to place a targeted advertisement 162 on client device 100.

In the embodiments illustrated above, the website 222 is used only to obtain a mapping between client device 100 and television 110 and between the client device 100 and the user ID (e.g. of user 180) of the ad exchange 726. Any bidding performed by the advertisement bidding module 754 for advertisement spots associated with user 180 may refer to any web site that is selling advertisement spots on the ad exchange 726 and is thus not limited to the website 222 that contained the tracking pixel.

We can extend the examples above to confirm that the web browser 202 is on the same private network with the television 110 if it is behind the same public IP address or public IP address range. In response to the redirection request from the web browser 202 to the advertisement targeting server 150, the advertisement targeting server 150 could respond with a redirect to the private IP address of the television 110. For the purposes of illustration, the television 110 has a private IP address 192.168.1.14, and thus the location URL of the redirect from the advertisement targeting server 150 may be:

HTTP/1.1 302 Found
Location: http://192.168.1.14:8080/disambiguate?user=U

If the browser successfully opens a connection to 192.168.1.14, then the TV knows the user 180 (e.g. with user ID U) is on the same private network with television 110 and is running on the device with private IP revealed in the request's IP packet headers and the MAC address revealed in the request's frame headers. The MAC address may be used to generate a long-term identifier for the client device 100 used by user 180 (e.g. with the user ID U). The television 110 may also take the opportunity to use other protocols that only work between devices on the same network, such as uPnP, to further interrogate the client device to determines its offered services which often includes a description of the device including its make and/or model. The television 110 may then communicate its confirmed association with user 180 on the web browser 202 running on the client device 100 with determined MAC address and/or MAC-address-derived long-term identifier and with any other information determined by interrogating the client device 100 back to the advertisement targeting server 150. The advertisement targeting server 150 may then store the confirmed association in the client device to television database 152.

Although the present embodiments have been described with reference to specific example embodiments, it will be evident that various modifications and changes may be made to these embodiments without departing from the broader spirit and scope of the various embodiments. For example, the discovery server 130, the advertisement identification server 140, and the advertisement targeting server 150 may all be in on central location (i.e. part of one server). Further, the databases and modules of each server may be organized differently (i.e. may be on different servers) in one or more embodiments. Accordingly, the specification and drawings are to be regarded in an illustrative in rather than a restrictive sense.

What is claimed is:

1. A machine-implemented method of targeted advertising to a client device, comprising:
   constraining an executable environment in a security sandbox;
   executing a sandboxed application in the constrained executable environment; and
   enabling, through the sandboxed application,
      automatically inferring at least one of a current association and a previous association of the client device with a media device networked to the client device;
      automatically identifying a first content displayed on the networked media device automatically inferred to be associated with the client device; and
      automatically targeting a second advertisement to the sandboxed application executing on the client device based on the identified first content,
   wherein at least one redirect from the security sandbox is used to communicate a user ID used by at least one of an advertisement exchange, a supply-side platform, a demand-side platform, and a third party advertisement server to at least one of the networked media device and an advertisement targeting server.

2. The method of claim 1, further comprising:
   determining from a schedule that a media program that a user previously watched is subsequently positioned to be aired as the first content;
   selecting an alphanumeric advertisement associated with the media program formatted for a display area of the client device based on a contextual match between the media program and the alphanumeric advertisement; and
   delivering the alphanumeric advertisement to the client device prior to the airing of the media program as the first content.

3. The method of claim 2, further comprising:
   determining from the schedule that a second media program that is contextually relevant to the media program is subsequently positioned to be aired;
   selecting another alphanumeric advertisement associated with the second media program formatted for the display area of the client device; and
   delivering the another alphanumeric advertisement to the client device prior to the airing of the second media program.

4. The method of claim 1, further comprising:
   delivering the second advertisement to the client device,
   wherein the first content s a first advertisement, and
   wherein the sandboxed application of the client device is a web browser.

5. The method of claim 1, wherein the second advertisement is interactive.

6. The method of claim 1,
   wherein the at least one of the current association and the previous association of the client device with the networked media device is inferred based on at least one of a public IP address range, a public IP address, a base station MAC address, a base station BSSID, a base station SSID, a Bluetooth MAC address, a geolocation, a WiFi direct MAC address of the networked media device, WiFi direct BSSID of the networked media device, a short code, a username, and a quick response (QR) code that is at least one of shared by and visible to both the client device and the networked media device.

7. The method of claim 1,
   wherein the at least one of the current association and the previous association of the client device with the networked media device is inferred based on a mutually visible identifying signal from the networked media device or a device external to the networked media device, independent of whether one or both of the networked media device and the client device can connect to a third device other than to receive an identifying signal.

8. The method of claim 1,
   wherein the at least one of the current association and the previous association of the client device with the networked media device is inferred based on whether instructing the sandboxed application of the client device to perform at least one of a multicast and a broadcast based discovery establishes communication between the client device and the networked media device.

9. The method of claim 1,
   wherein the automatic identification is through an automatic content recognition (ACR) of the networked media device.

10. The method of claim 1,
    wherein an advertisement spot is submitted to the advertisement exchange to enable a bidder to buy ads without requiring the sandboxed application to integrate with content ID based advertisement targeting, and without requiring the sandboxed application to be cognizant of the content ID based advertisement targeting.

11. The method of claim 1, comprising automatically inferring the at least one of the current association and the previous association of the client device with the networked media device in accordance with the sandboxed application executing on the client device discovering the networked media device when on a private computer network common to both the client device and the networked media device.

12. A system of targeted advertising, comprising:
    a client device to:
       constrain an executable environment in a security sandbox; and
       execute a sandboxed application in the constrained executable environment;
    a media device networked to the client device; and
    one or more servers communicatively coupled to both the client device and the networked media device through a computer network to, in conjunction with the sandboxed application executing on the client device:
       automatically infer at least one of a current association and a previous association of the client device with the networked media device,
       automatically identify a first advertisement displayed on the networked media device automatically inferred to be associated with the client device, and
       automatically target a second advertisement to a webpage displayed by the sandboxed application of the client device based on the identified first advertisement,
       wherein at least one redirect from the security sandbox is used to communicate a user ID used by at least one of an advertisement exchange, a supply-side platform, a demand-side platform, and a third party advertisement server to at least one of the networked media device and an advertisement targeting server.

13. The system of claim 12, wherein:
    the networked media device comprises a frame buffer communicatively coupled to a processor, the processor is configured to generate at least one fingerprint,
the at least one fingerprint comprises at least one age fingerprint, a sequence of image fingerprints, a fingerprint of a sequence of images, and an audio fingerprint, and
the processor is configured to communicate the at least one fingerprint to the one or more servers.

14. The system of claim 13, wherein the automatic identification of the first advertisements based on an advertisement fingerprint database and the at least one fingerprint.

15. The system of claim 14, wherein the one or more servers is further configured to:
receive the at least one fingerprint,
automatically identify a channel the networked media device is tuned to based on the at least one fingerprint, and
generate one or more channel-specific fingerprints, and
wherein the automatic identification of the first advertisement is based on advertisement fingerprint database and the one or more channel-specific fingerprints.

16. The system of claim 12, wherein the second advertisement is interactive.

17. The system of claim 12,
wherein the at least one of the current association and the previous association of the client device with the networked media device is inferred based on at least one of a public IP address range, a public IP address, a base station MAC address, a base station BSSID, a base station SSID, a Bluetooth MAC address, a geolocation, a WiFi direct MAC address of the networked media device, WiFi direct BSSID of the networked media device, a short code, a username, and a QR code that is at least one of shared by and visible to both the client device and the networked media device.

18. The system of claim 12,
wherein the at least one of the current association and the previous association of the client device with the networked media device is inferred based on a mutually visible identifying signal from the networked media device or a device external to the networked media device, independent of whether one or both of the networked media device and the client device can connect to a third device other than to receive an identifying signal.

19. The system of claim 12, wherein an advertisement spot is submited to an advertisement exchange.

20. The system of claim 12,
wherein the at least one of the current association and the previous association of the client device with the networked media device is inferred based on whether instructing the sandboxed application of the client device to perform at least one of a multicast and a broadcast based discovery establishes communication between the client device and the networked media device.

21. The system of claim 12, wherein the one or more servers, in conjunction with the sandboxed application executing on the client device, is configured to automatically infer the at least one of the current association and the previous association of the client device with the networked media device in accordance with the sandboxed application executing on the client device discovering the networked media device when on a private computer network common to both the client device and the networked media device.

22. A system of targeted advertising, comprising:
a client device to:
constrain an executable environment in a security sandbox; and
execute a sandboxed application in the constrained executable environment, the sandboxed application being a web browser;
a media device networked to the client device; and
one or more servers communicatively coupled to both the client device and the networked media device through a computer network to, in conjunction with the sandboxed application executing on the client device:
automatically infer at least one of a current association and a previous association of the client device with the networked media device,
automatically identify a first advertisement displayed on the networked media device automatically inferred to be associated with the client device, and
automatically target a second advertisement to the sandboxed application of the client device based on the identified first advertisement,
wherein at least one redirect from the security sandbox is used to communicate a user ID used by at least one of an advertisement exchange, a supply-side platform, a demand-side platform, and a third party advertisement server to at least one of the networked media device and an advertisement targeting server.

23. The system of claim 22, wherein:
the networked media device comprises a frame buffer communicatively coupled to a processor,
the processor is configured to generate one or more fingerprints,
the one or more fingerprints comprises at least one of an image fingerprint, a sequence of image fingerprints, a fingerprint of a sequence of images, and an audio fingerprint, and
the processor is configured to communicate the one or more fingerprints to the one or more servers.

24. The system of claim 23, wherein the automatic identification of the first advertisement is based on an advertisement fingerprint database and the one or more fingerprints.

25. The system of claim 24, wherein the one or more servers is further configured to:
receive the one or more fingerprints,
automatically identify a channel the networked media device is tuned to based on the one or more fingerprints, and
generate one or more channel-specific fingerprints, and
wherein the automatic identification of the first advertisement is based on the advertisement fingerprint database and the one or more channel-specific fingerprints.

26. The system of claim 22, wherein the second advertisement is interactive.

27. The system of claim 22,
wherein the at least one of the current association and the previous association of the client device with the networked media device is inferred based on at least one of a public IP address range, a public IP address, a base station MAC address, a base station BSSID, a base station SSID, a Bluetooth MAC address, a geolocation, a WiFi direct MAC address of the networked media device, WiFi direct BSSID of the networked media device, a short code, a username, and a QR code that is at least one of shared by and visible to both the client device and the networked media device.

28. The system of claim 22, wherein the at least one of the current association and the previous association of the client device with the networked media device is inferred based on a mutually visible identifying signal from the networked media device or a device external to the networked media device, independent of whether one or both of the networked media device and the client device can connect to a third device other than to receive an identifying signal.

29. The system of claim 22, wherein the at least one of the current association and the previous association of the client device with the networked media device is inferred based on whether instructing the sandboxed application of the client device to perform at east one of a multicast and a broadcast based discovery establishes communication between the client device and the networked media device.

30. The system of claim 22, wherein the one or more servers, in conjunction with the sandboxed application executing on the client device, is configured to automatically infer the at least one of the current association and the previous association of the client device with the networked media device in accordance with the sandboxed application executing on the client device discovering the networked media device when on a private computer network common to both the client device and the networked media device.

* * * * *